US010262193B2

(12) United States Patent
Yamaji et al.

(10) Patent No.: US 10,262,193 B2
(45) Date of Patent: Apr. 16, 2019

(54) IMAGE PROCESSING APPARATUS AND METHOD WHICH DETERMINE AN INTIMACY BETWEEN A PERSON IN AN IMAGE AND A PHOTOGRAPHER OF THE IMAGE

(71) Applicant: FUJIFILM Corporation, Tokyo (JP)

(72) Inventors: Kei Yamaji, Tokyo (JP); Tetsuya Matsumoto, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 93 days.

(21) Appl. No.: 15/439,971

(22) Filed: Feb. 23, 2017

(65) Prior Publication Data

US 2017/0270353 A1    Sep. 21, 2017

(30) Foreign Application Priority Data

Mar. 16, 2016  (JP) .................................. 2016-052081

(51) Int. Cl.
G06K 9/00       (2006.01)
G06K 9/62       (2006.01)

(52) U.S. Cl.
CPC ..... *G06K 9/00302* (2013.01); *G06K 9/00362* (2013.01); *G06K 9/00771* (2013.01); *G06K 9/6267* (2013.01)

(58) Field of Classification Search
CPC ........... G06K 9/00302; G06K 9/00362; G06K 9/00771; G06K 9/6267
See application file for complete search history.

(56) References Cited

U.S. PATENT DOCUMENTS 9,196,042 B2 * 11/2015 Higa .................... G06F 17/3079
9,406,158 B2 *  8/2016 Yamaji ............... G06K 9/00684
(Continued)

FOREIGN PATENT DOCUMENTS

JP    2001-297051 A    10/2001
JP    2004-127285 A     4/2004
(Continued)

OTHER PUBLICATIONS

Fujifilm, "Year Album Simple Creation of Photobook and Photo Album", [online], Mar. 1, 2016, [Search on Mar. 10, 2016], the Internet <URL:http://year-album.jp/>.
(Continued)

*Primary Examiner* — Mia M Thomas
(74) *Attorney, Agent, or Firm* — Studebaker & Brackett PC

(57) ABSTRACT

There are provided an image processing apparatus, an image processing method, a program, and a recording medium capable of calculating the actual intimacy between persons even in a case where there is a deviation in the actual intimacy between persons by calculating the intimacy between persons in consideration of only the contents of images. In the image processing apparatus, the image processing method, the program, and the recording medium of the invention, a person specifying unit determines persons appearing in each image, and specifies one or more first persons among the determined persons. An intimacy calculation unit calculates the intimacy between the first person and each photographer based on the presence of a first person in each image and photographer information of each image.

25 Claims, 32 Drawing Sheets

(56) References Cited

U.S. PATENT DOCUMENTS

| | | | | |
|---|---|---|---|---|
| 2006/0061598 | A1* | 3/2006 | Mino | G06K 9/00228 345/629 |
| 2008/0080774 | A1* | 4/2008 | Jacobs | H04N 1/00132 382/220 |
| 2008/0089590 | A1* | 4/2008 | Isomura | G06F 17/3028 382/217 |
| 2008/0133649 | A1* | 6/2008 | Pennington | G06F 3/14 709/203 |
| 2009/0116752 | A1* | 5/2009 | Isomura | G06F 17/30265 382/217 |
| 2009/0164561 | A1* | 6/2009 | Ono | G06T 11/60 709/203 |
| 2009/0304289 | A1* | 12/2009 | Karimoto | H04N 5/232 382/224 |
| 2010/0079613 | A1* | 4/2010 | Karimoto | G06K 9/00261 348/222.1 |
| 2011/0029860 | A1* | 2/2011 | Ptucha | G06F 17/248 715/246 |
| 2011/0234613 | A1* | 9/2011 | Hanson | G06F 17/30265 345/589 |
| 2011/0285748 | A1* | 11/2011 | Slatter | G06T 11/60 345/629 |
| 2012/0183239 | A1* | 7/2012 | Tsukagoshi | G06F 17/30265 382/305 |
| 2013/0147933 | A1* | 6/2013 | Kulas | H04N 21/41407 348/61 |
| 2013/0156275 | A1* | 6/2013 | Amacker | G06K 9/00677 382/118 |
| 2013/0279747 | A1* | 10/2013 | Higa | G06F 17/3079 382/103 |
| 2014/0009495 | A1* | 1/2014 | Sakai | G06T 11/60 345/634 |
| 2014/0161356 | A1* | 6/2014 | Tesch | H04L 51/063 382/196 |
| 2015/0086116 | A1* | 3/2015 | Yamaji | G06T 11/60 382/190 |
| 2015/0092070 | A1* | 4/2015 | Hatano | G06T 11/60 348/211.3 |
| 2016/0004413 | A1* | 1/2016 | Leydon | G07F 17/3244 715/838 |
| 2016/0035123 | A1* | 2/2016 | Bonansea | G06T 13/80 345/473 |
| 2016/0127641 | A1* | 5/2016 | Gove | G06T 1/0007 348/143 |
| 2016/0180560 | A1* | 6/2016 | Patel | H04M 1/72552 345/636 |
| 2016/0330327 | A1* | 11/2016 | Lee | H04L 12/12 |
| 2017/0270353 | A1* | 9/2017 | Yamaji | G06K 9/6267 |
| 2018/0143761 | A1* | 5/2018 | Choi | G06F 3/0482 |

FOREIGN PATENT DOCUMENTS

| | | |
|---|---|---|
| JP | 2008-257308 A | 10/2008 |
| JP | 2011-514575 A | 5/2011 |
| JP | 2014-225206 A | 12/2014 |
| JP | 2015-069431 A | 4/2015 |
| JP | 2015-089112 A | 5/2015 |
| JP | 2015-133000 A | 7/2015 |
| WO | 2013/132557 A1 | 9/2013 |

OTHER PUBLICATIONS

Fujifilm, "Create Photobook for Writing With Year Album That Everyone Makes! Fujifilm", [online], Mar. 1, 2016, [Search on Mar. 10, 2016], the Internet <URL:http://year-album.jp/minna/>.

Fujifilm, "How to Make: Create Photobook for Writing With Year Album That Everyone Makes! Fujifilm", [online], Mar. 1, 2016, [Search on Mar. 10, 2016], the Internet <URL:http://yearalbum.jp/minna/login/).

An Office Action mailed by the Japanese Patent Office dated Feb. 12, 2019, which corresponds to Japanese Patent Application No. 2016-052081 and is related to U.S. Appl. No. 15/439,971; with English translation.

* cited by examiner

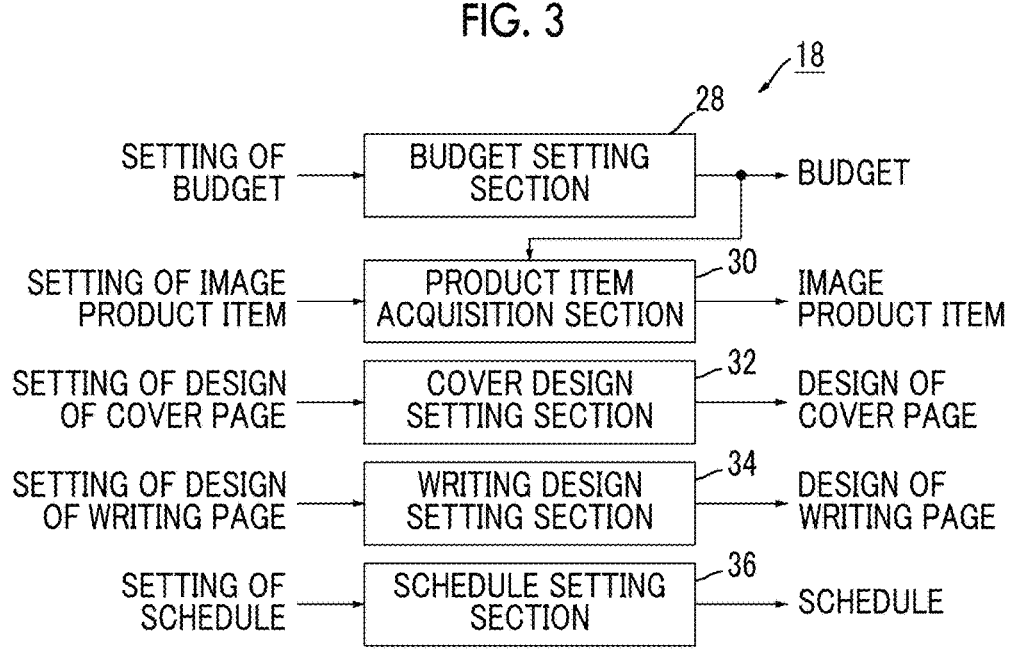
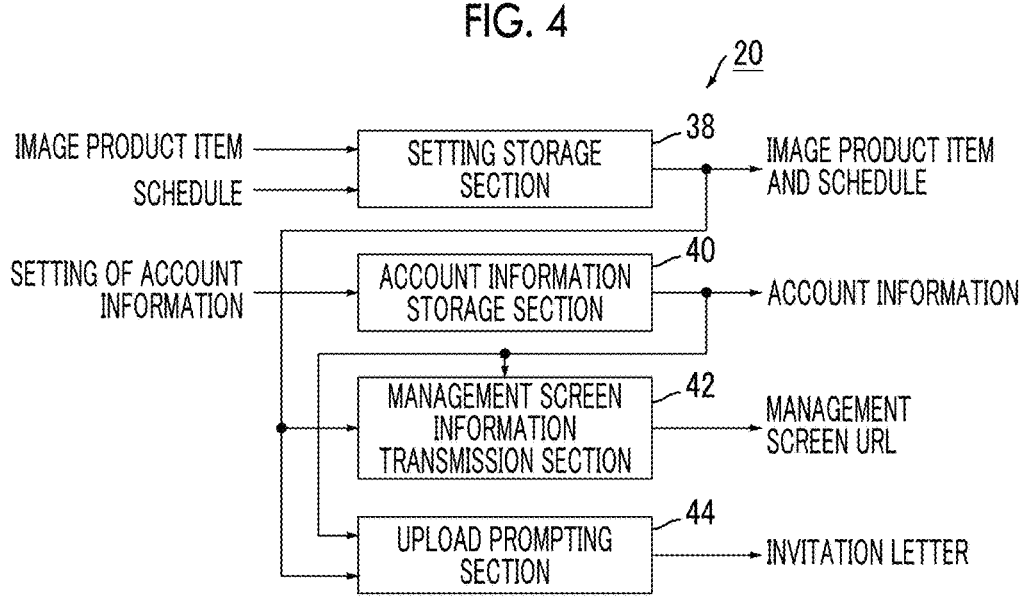

FIG. 23

```
<  4. CREATE/SEND INVITATION LETTER
STEP1>STEP2>STEP3>STEP4
1/3   PLEASE INPUT MESSAGE OF INVITATION
      LETTER TO BE SENT TO EVERYONE.

MESSAGE OF INVITATION LETTER

LET'S MAKE PHOTOBOOK WITH YOUR
PHOTOS AND MESSAGES!

NUMBER OF CHARACTERS: 51/150

NEXT
```

FIG. 25

| < | 4. CREATE/SEND INVITATION LETTER |
|---|---|

STEP1>STEP2>STEP3>STEP4

| 3/3 | PLEASE SEND INVITATION LETTER AND PASSWORD TO EVERYONE BY SNS OR E-MAIL. |
|---|---|

SEND INVITATION LETTER

| SNS | E-MAIL |
|---|---|

INVITATION LETTER URL http://XXXXXXX

PASSWORD

5865

| NEXT |
|---|

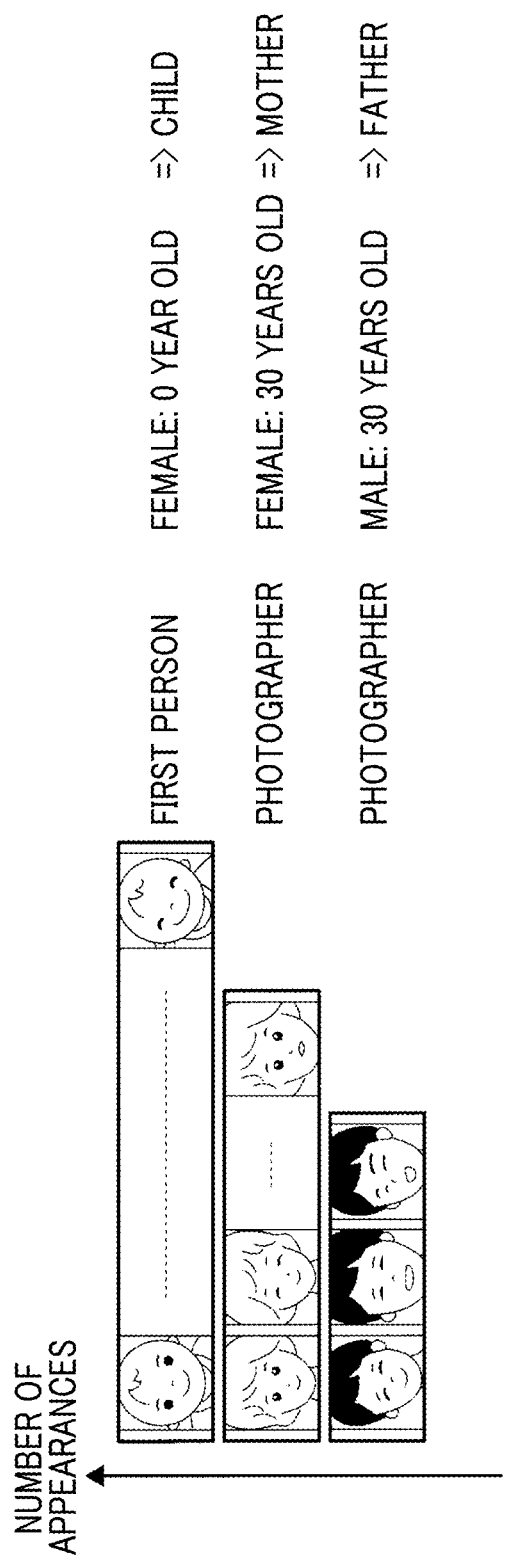

IMAGE PROCESSING APPARATUS AND METHOD WHICH DETERMINE AN INTIMACY BETWEEN A PERSON IN AN IMAGE AND A PHOTOGRAPHER OF THE IMAGE

CROSS-REFERENCE TO RELATED APPLICATIONS

The present application claims priority under 35 U.S.C. § 119 to Japanese Patent Application No. 2016-052081, filed on Mar. 16, 2016. Each of the above application(s) is hereby expressly incorporated by reference, in its entirety, into the present application.

BACKGROUND OF THE INVENTION

1. Field of the Invention

The present invention relates to an image processing apparatus, an image processing method, a program, and a recording medium for creating a composite image, such as a photobook, using a plurality of images acquired from terminal devices of a plurality of users through a network.

2. Description of the Related Art

A photobook is a service to create a photo collection of a layout that a user desires using a plurality of transmitted images (image data) when the user transmits the plurality of images to the service provider through the Internet.

For example, a photobook is created by classifying a plurality of images into a plurality of groups based on the imaging time or the like in consideration of the continuity or relevance of images and automatically arranging (automatically laying out) images included in each group on corresponding pages.

In recent years, not only creating one photobook using a plurality of images owned by one user but also creating one photobook using a plurality of images owned by a plurality of users (refer to JP2008-257308A and JP2015-069431A), acquiring messages for writing from a plurality of users and creating a writing using the messages for writing acquired from the plurality of users (refer to JP2001-297051A and JP2015-133000A), determining the theme of an image group and creating a composite image based on the theme of the image group (refer to JP2015-089112A), and the like are known.

In practice, there is also a service of creating one photobook using a plurality of images owned by a plurality of users, messages send by the plurality of users, and the like (refer to "Year Album Simple Creation Of Photobook And Photo Album", [online], Mar. 1, 2016, Fujifilm, [Search on Mar. 10, 2016], the Internet <URL:http://year-album.jp/>, "Create Photobook For Writing With Year Album That Everyone Makes!|Fujifilm", [online], Mar. 1, 2016, Fujifilm, [Search on Mar. 10, 2016], the Internet <URL:http://year-album.jp/minna/, and "How To Make: Create Photobook For Writing With Year Album That Everyone Makes!|Fujifilm", [online], Mar. 1, 2016, Fujifilm, [Search on Mar. 10, 2016], the Internet <URL:http://year-album.jp/minna/login/)

SUMMARY OF THE INVENTION

In the case of calculating the intimacy between persons appearing in images, there are known, for example, a method of calculating the intimacy between persons appearing in one or a plurality of images based on the contents of the images and a method of calculating the intimacy under the assumption that there are some relationships between other persons in a case where there is a person appearing in common in two images among a plurality of persons appearing in one of the two images and a plurality of persons appearing in the other image.

However, persons (for example, a father in a family and a person who likes very much as a role of a photographer in a plurality of friends) who often behave as photographers even if they are actually intimate with each other do not appear in images in many cases. As a result, there is a difference between the intimacy between persons, which is calculated based on the contents of each image, and the actual intimacy between the persons. Such a problem has not taken into consideration in JP2008-257308A, JP2015-069431A, JP2001-297051A, JP2015-133000A, and JP2015-089112A).

It is an object of the invention to provide an image processing apparatus, an image processing method, a program, and a recording medium capable of calculating the actual intimacy between persons even in a case where there is a deviation in the actual intimacy between persons by calculating the intimacy between persons in consideration of only the contents of images.

In order to achieve the aforementioned object, the invention provides an image processing apparatus comprising: an image acquisition unit that acquires a plurality of images from terminal devices of a plurality of users through a network; a photographer information acquisition unit that acquires information of a photographer who has captured each of the plurality of images, through the network, from the terminal devices of the plurality of users; an image analysis unit that analyzes contents of each of the images; a person specifying unit that determines persons appearing in each of the images based on an analysis result of each of the images and specifies one or more first persons among the determined persons; and an intimacy calculation unit that calculates an intimacy between the first person and each photographer based on presence of the first person in each of the images and the photographer information of each of the images.

It is preferable that the intimacy calculation unit calculates a photographer who has captured a large number of images, in which the first person whose proportion occupying an image exceeds a first threshold value or whose imaging distance is less than a second threshold value appears, as a photographer with a high intimacy with the first person, rather than a photographer who has captured a small number of images, in which the first person whose proportion occupying an image exceeds the first threshold value or whose imaging distance is less than the second threshold value appears.

It is preferable that the intimacy calculation unit calculates a photographer who has captured a large number of images in which the first person having a specific facial expression appears, rather than a photographer who has captured a small number of images in which the first person having the specific facial expression appears, as a photographer with a high intimacy with the first person.

It is preferable that the intimacy calculation unit calculates a photographer who has captured images in which the first person having many kinds of facial expressions appears, rather than a photographer who has captured images in which the first person having few kinds of facial expressions appears, as a photographer with a high intimacy with the first person.

It is preferable that the intimacy calculation unit calculates a photographer who has captured a large number of images in which the first person appears, rather than a photographer who has captured a small number of images in which the first person appears, as a photographer with a high intimacy with the first person.

It is preferable that the intimacy calculation unit calculates a photographer with a large number of days of capturing images in which the first person appears, rather than a photographer with a small number of days of capturing images in which the first person appears, as a photographer with a high intimacy with the first person.

It is preferable that the intimacy calculation unit calculates a photographer who has captured images in which the first person appears in a large number of places, rather than a photographer who has captured images in which the first person appears in a small number of places, as a photographer with a high intimacy with the first person.

It is preferable that the intimacy calculation unit calculates a photographer who has captured images in which the first person appears in a large number of time zones, rather than a photographer who has captured images in which the first person appears in a small number of time zones, as a photographer with a high intimacy with the first person.

It is preferable to further comprise: a theme determination unit that determines a theme of the plurality of images based on the analysis result of each of the images and at least one of an imaging period, the number of imaging days, the number of imaging sheets, and imaging locations of the plurality of images; an age and sex determination unit that determines age and sex of each person appearing in each image based on the analysis result of each image; and a human relationship determination unit that determines a human relationship between the first person and each photographer based on at least one of the theme, the age of the person, the sex of the person, and a person appearing in an image captured by each photographer. It is preferable that the intimacy calculation unit further calculates an intimacy between the first person and each of the users based on a human relationship between the first person and each photographer.

It is preferable to further comprise an image division unit that divides the plurality of images into a plurality of groups including images in which the respective persons appear. It is preferable that the age and sex determination unit determines age and sex of each person appearing in images included in each of the plurality of groups based on the analysis result of each image.

It is preferable to further comprise an image number calculation unit that calculates the number of images in which each of the persons appears. It is preferable that the theme determination unit further determines a sub-theme of the theme of the plurality of images based on the number of images in which each of the persons appears and that the human relationship determination unit determines a human relationship between the first person and each photographer based on at least the sub-theme.

It is preferable to further comprise: an image extraction unit that extracts images to be used in a composite image, as compositing target images, from the plurality of images based on the intimacy between the first person and each photographer; and a composite image creation unit that creates the composite image using the compositing target images.

It is preferable that the image extraction unit extracts the compositing target images from the plurality of images by giving priority to an image captured by a photographer with a high intimacy with the first person over an image captured by a photographer with a low intimacy with the first person.

It is preferable that the image extraction unit extracts the compositing target images from the plurality of images by giving priority to an image captured by a photographer with a low intimacy with the first person over an image captured by a photographer with a high intimacy with the first person.

It is preferable to further comprise a mode setting unit that acquires information of one mode of a first mode, a second mode, and a third mode set by a first user of the plurality of users, through the network, from a terminal device of the first user. It is preferable that the image extraction unit extracts the compositing target images from the plurality of images by giving priority to an image captured by a photographer with a high intimacy with the first person over an image captured by a photographer with a low intimacy with the first person based on the information of the mode in a case where the first mode is set, extracts the compositing target images from the plurality of images by giving priority to an image captured by a photographer with a low intimacy with the first person over an image captured by a photographer with a high intimacy with the first person based on the information of the mode in a case where the second mode is set, and extracts the compositing target images from the plurality of images based on the information of the mode regardless of the intimacy between the first person and each photographer in a case where the third mode is set.

It is preferable to further comprise an image specifying unit that specifies an image captured by each of a plurality of photographers corresponding to the plurality of users, among the plurality of images, based on the photographer information of each of the images.

It is preferable to further comprise an image specifying unit that specifies an image captured by each of a plurality of photographers corresponding to the plurality of users, among the plurality of images, based on information of a photographer of each of the images included in accessory information of each of the images.

It is preferable to further comprise an image specifying unit that, in a case where each of the images is acquired from a terminal device of each of the users by the image acquisition unit, determines that the user of each terminal device from which each of the images has been acquired is each photographer who has captured each of the acquired images and specifies an image captured by each of a plurality of photographers corresponding to the plurality of users among the plurality of images.

It is preferable to further comprise an important person acquisition unit that acquires an important person among the first persons. It is preferable that the image acquisition unit further acquires a face image of each of the users, the person specifying unit further specifies each of the users among the plurality of persons based on the face image of each of the users, the image specifying unit further specifies an image in which each of the photographers corresponding to the users appears, among the plurality of images, based on each specified user, and the image extraction unit further extracts the compositing target images from the plurality of images by giving priority to an image in which a photographer with a high intimacy with the important person appears over an image in which a photographer with a low intimacy with the important person appears.

In addition, the invention provides an image processing method including: a step in which an image acquisition unit acquires a plurality of images from terminal devices of a plurality of users through a network; a step in which a photographer information acquisition unit acquires information of a photographer who has captured each of the plurality of images, through the network, from the terminal devices of the plurality of users; a step in which an image analysis unit analyzes contents of each of the images; a step in which a person specifying unit determines persons appearing in each of the images based on an analysis result of each of the images and specifies one or more first persons among the determined persons; and a step in which an intimacy calculation unit calculates an intimacy between the first person and each photographer based on presence of the first person in each of the images and the photographer information of each of the images.

It is preferable to further include: a step in which a theme determination unit determines a theme of the plurality of images based on the analysis result of each of the images and at least one of an imaging period, the number of imaging days, the number of imaging sheets, and imaging locations of the plurality of images; a step in which an age and sex determination unit determines age and sex of each person appearing in each image based on the analysis result of each image; and a step in which a human relationship determination unit determines a human relationship between the first person and each photographer based on at least one of the theme, the age of the person, the sex of the person, and a person appearing in an image captured by each photographer. It is preferable that, in the step of calculating the intimacy, an intimacy between the first person and each of the users is further calculated based on a human relationship between the first person and each photographer.

It is preferable to further include: a step in which an image extraction unit extracts images to be used in a composite image, as compositing target images, from the plurality of images based on the intimacy between the first person and each photographer; and a step in which a composite image creation unit creates the composite image using the compositing target images.

It is preferable to further include a step in which an image specifying unit specifies an image captured by each of a plurality of photographers corresponding to the plurality of users, among the plurality of images, based on the photographer information of each of the images.

It is preferable to further include: a step in which an important person acquisition unit acquires an important person among the first persons; a step in which the image acquisition unit acquires a face image of each of the users; a step in which the person specifying unit specifies each of the users among the plurality of persons based on the face image of each of the users; and a step in which the image specifying unit specifies an image in which each of the photographers corresponding to the users appears, among the plurality of images, based on each specified user. It is preferable that, in the step of extracting an image, the compositing target images are further extracted from the plurality of images by giving priority to an image in which a photographer with a high intimacy with the important person appears over an image in which a photographer with a low intimacy with the important person appears.

In addition, the invention provides a program causing a computer to execute each step of the image processing method described above.

In addition, the invention provides a computer-readable recording medium in which a program causing a computer to execute each step of the image processing method described above is recorded.

According to the invention, it is possible to calculate the actual intimacy between persons appearing in a plurality of images by calculating the intimacy between the first person and each photographer.

BRIEF DESCRIPTION OF THE DRAWINGS

FIG. 3 is a block diagram of an embodiment showing the configuration of an information setting unit shown in FIG. 2.

FIG. 4 is a block diagram of an embodiment showing the configuration of an information management unit shown in FIG. 2.

FIG. 23 is a conceptual diagram of an example showing a screen for creating an invitation letter to be sent to the terminal device of the participating user.

FIG. 25 is a conceptual diagram of an example showing a screen for sending an invitation letter to the terminal device of the participating user.

FIG. 27 is a conceptual diagram of an example showing a screen for inputting a common password for accessing a screen onto which participating users uploads images used in a composite image, evaluation information of images, messages for writing, and the like.

FIG. 37 is a conceptual diagram of an example showing the number of appearances, age, and sex of a person appearing in a plurality of images.

DESCRIPTION OF THE PREFERRED EMBODIMENTS

Hereinafter, an image processing apparatus, an image processing method, a program, and a recording medium of the invention will be described in detail based on a preferred embodiment shown in the accompanying diagrams.

Figure 1:
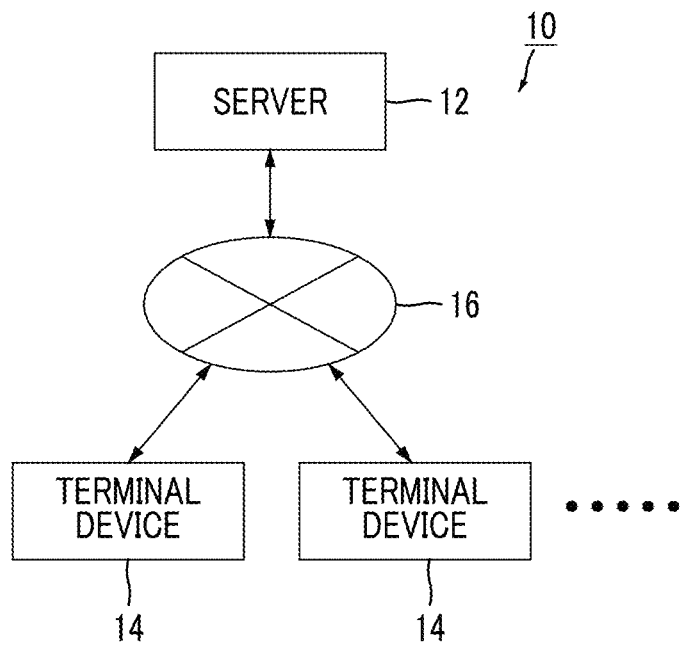
FIG. 1 is a block diagram of an embodiment showing the configuration of an image processing apparatus according to the invention.

FIG. 1 is a block diagram of an embodiment showing the configuration of the image processing apparatus according to the invention. An image processing apparatus 10 shown in FIG. 1 creates a composite image, such as a photobook including a writing page, using a plurality of images acquired from terminal devices of a plurality of users involved in the creation of a composite image through a network 16. The image processing apparatus 10 includes a server 12 and terminal devices (clients) 14 of a plurality of users connected to the server 12 through the network 16.

The server 12 performs various kinds of data processing for creating a composite image based on an instruction from the terminal device 14, and is configured by, for example, a desktop personal computer (PC) or a workstation.

The terminal device 14 gives various instructions to the server 12 to perform various kinds of data processing, and is configured by, for example, a smartphone, a tablet PC, or a notebook PC.

The network 16 is, for example, a telephone line or the Internet circuit, and connects the server 12 and the terminal device 14 to each other by wired or wireless connection to enable bidirectional communication.

Figure 2:
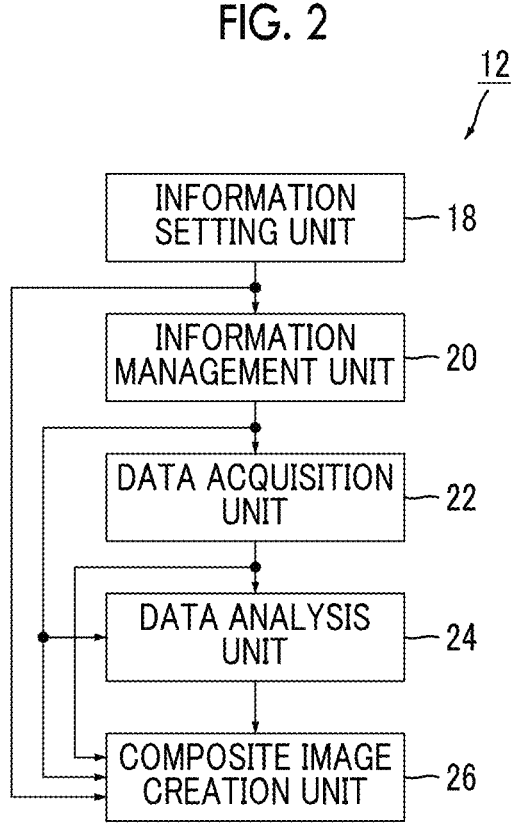
FIG. 2 is a block diagram of an embodiment showing the configuration of a server shown in FIG. 1.

FIG. 2 is a block diagram of an embodiment showing the configuration of the server shown in FIG. 1. The server 12 shown in FIG. 2 includes an information setting unit 18 for setting various kinds of information regarding a composite image, an information management unit 20 for managing various kinds of information regarding the creation of a composite image, a data acquisition unit 22 for acquiring various kinds of data used in a composite image, a data analysis unit 24 for analyzing various kinds of data used in a composite image, and a composite image creation unit 26 for creating a composite image.

In the following explanation, among a plurality of users involved in the creation of a composite image including a main page and a writing page, one user who creates a composite image is expressed as a secretary user, and two or more users including the secretary user are expressed as participating users. For example, a case where a secretary is one of a group of friends corresponds to this.

However, in another embodiment, in a case where the secretary himself or herself provides neither photos nor messages, such as a case where a photo shop undertakes an agency as a secretary, it is assumed that the number of secretary users does not include the number of participating users.

FIG. 3 is a block diagram showing the configuration of an embodiment showing the configuration of the information setting unit shown in FIG. 2. The information setting unit 18 shown in FIG. 3 includes a budget setting section 28, a product item acquisition section 30, a cover design setting section 32, a writing design setting section 34, and a schedule setting section 36.

The budget setting section 28 acquires information regarding a budget for a composite image, which is set by the secretary user, from the terminal device 14 of the secretary user through the network 16.

Subsequently, the product item acquisition section 30 acquires one image product item set by the secretary user, among one or more image product items (information of image product items) with a size and the number of pages corresponding to the budget information acquired by the budget setting section 28, from the terminal device 14 of the secretary user through the network 16.

The image product material is a material for creating an image product, and includes, for example, a photo album such as a photobook, a shuffle print, a calendar with an image, and the like. Images are mainly photos.

In addition, image product items include a plurality of types of image product items having at least different sizes or different numbers of pages. The number of pages of the image product item is the number of pages including a main page and a writing page. An image product includes an image product of a paper medium and an image product of electronic data.

A page referred to in the invention means a unit for performing images arrangement and writings arrangement. In the present embodiment, a page refers to a two-page spread page. However, in other embodiments, a page may be a single-sided page. In addition, a two-page spread page may be set as a unit in the image processing apparatus of the present embodiment, and the number of pages of the image product item may be displayed for the user with the single-sided page as a unit.

The photobook is, for example, a composite image obtained by arranging a plurality of images selected by the user on a plurality of pages in a layout that the user desires.

In addition, the photobook may be a composite image obtained by arranging images, which are automatically selected from images in a desired period (for example, one year) that are held by the user, on a plurality of pages in an automatic layout (for example, an ear album manufactured by FUJIFILM Co., Ltd.). In addition, the shuffle print is a composite image obtained by arranging a plurality of images on one print by shuffling the plurality of images. The calendar with an image is a composite image obtained by arranging images corresponding to the calendar of each month, for example.

In the case of the present embodiment, a composite image is a photobook that includes a writing page at the end of the book. The writing page is a composite image in which messages for writing of two or more participating users acquired from the terminal devices 14 of the participating users are arranged. The message for writing is a message of each participating user used in the writing page.

In addition to the message for writing, a profile image may be placed on the writing page. Although the profile image is, for example, a face image of each participating user, other images may be used.

Subsequently, the cover design setting section 32 acquires information regarding the design of one cover page set by the secretary user, among the design of one or more cover pages, from the terminal device 14 of the secretary user through the network 16.

The information of the design of the cover page includes, for example, not only design information, such as a cover page pattern and illustrations drawn on the cover page, but also information of the title of a composite image described on the cover page, information of the color of the cover page, and the like.

Subsequently, the writing design setting section 34 acquires information regarding the design of one writing page set by the secretary user, among the design of one or more writing pages, from the terminal device 14 of the secretary user through the network 16.

The information of the design of the writing page includes, for example, information of a template in which positions, sizes, and the like for arranging the profile image and message for writing of each participating user on the writing page are set in advance.

Subsequently, the schedule setting section 36 acquires schedule information, which includes the deadline for images and messages for writing set by the secretary user, a composite image creation period, and the delivery date of an image product, from the terminal device 14 of the secretary user through the network 16.

The deadline for images and messages for writing indicates a deadline before which each participating user can upload (submit) images and messages for writing, that is, a deadline before which the image processing apparatus 10 can acquire images and messages for writing from the terminal device 14 of the participating user.

In addition, the composite image creation period indicates a period during which the secretary user creates a composite image using a plurality of images acquired from the terminal devices 14 of a plurality of users, in other words, a deadline for ordering an image product. The delivery date of an image product indicates a date to deliver the image product.

Subsequently, FIG. 4 is a block diagram of an embodiment showing the configuration of the information management unit shown in FIG. 2. The information management unit 20 shown in FIG. 4 includes a setting storage section 38, an account information storage section 40, a management screen information transmission section 42, and an upload prompting section 44.

The setting storage section 38 stores the information of the image product item acquired by the product item acquisition section 30 and the schedule acquired by the schedule setting section 36.

Subsequently, the account information storage section 40 acquires secretary user account information set by the secretary user from the terminal device 14 of the secretary user through the network 16. In addition, the account information storage section 40 acquires participating user account information set by the participating user from the terminal device 14 of the participating user through the network 16, and stores the participating user account information.

Figure 29:
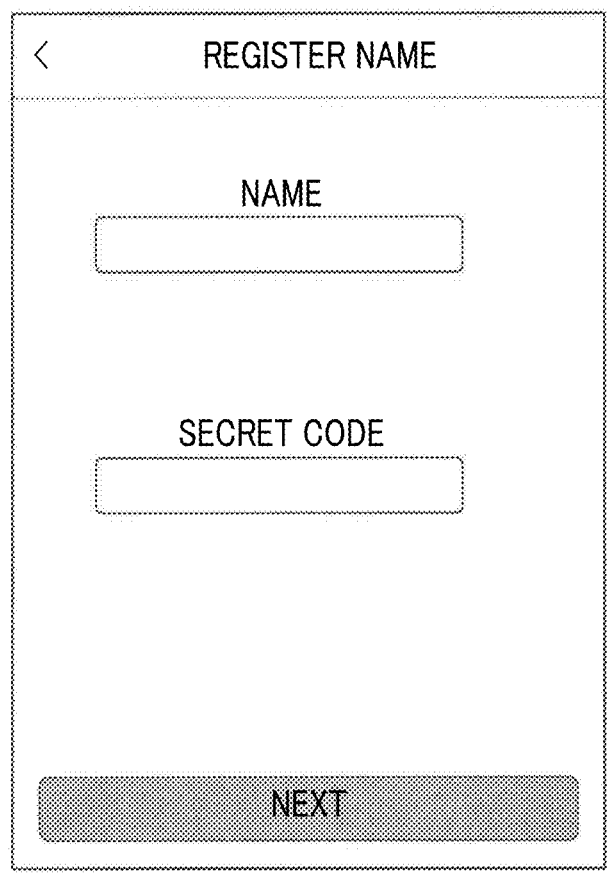
FIG. 29 is a conceptual diagram of an example showing a screen for registering a name registered as a participating user and a secret code.

For example, the secretary user account information is the e-mail address of the secretary user and the secretary password. On the other hand, the participating user account information is the name and individual password of the participating user (for the participating user, displayed as a "secret code" as shown in FIG. 29). The name of the participating user is used by the participating user to manage secretary users, and the individual password is used by the image processing apparatus 10 to specify a participating user. In the case of the present embodiment, it is assumed that the secret code cannot be changed and reissued later.

Subsequently, the management screen information transmission section 42 transmits a message, which includes an uniform resource locator (URL) required when the secretary user accesses a management screen for managing an image product item, a schedule, and the like, to the terminal device 14 of the secretary user through the network 16. The secretary user can make changes to secretary users, addition of a secretary user (for example, addition of a deputy secretary described later), and the like in addition to changing the image product item and schedule from the management screen.

For example, the management screen information transmission section 42 transmits a message including an URL for accessing the management screen, to the e-mail address of the secretary user acquired by the account information storage section 40, by e-mail.

Subsequently, the upload prompting section 44 sends an invitation letter created by the secretary user to the terminal device 14 of the participating user through the network 16.

The invitation letter is for inviting participating users to create a composite image, and is reminder information to prompt the participating users to upload images used in the composite image, evaluation information for each image, a profile image, a message for writing, and the like.

The upload prompting section 44 sends the invitation letter to the terminal device 14 of each participating user through a message of social networking service (SNS) or by e-mail, for example.

Figure 5:
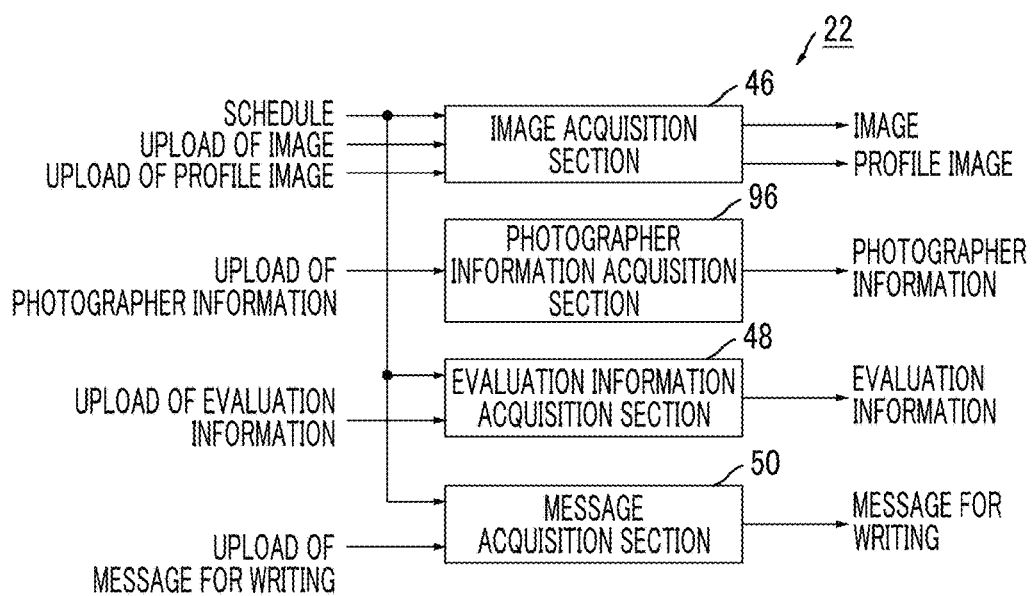
FIG. 5 is a block diagram of an embodiment showing the configuration of a data acquisition unit shown in FIG. 2.

Subsequently, FIG. 5 is a block diagram of an embodiment showing the configuration of the data acquisition unit shown in FIG. 2. The data acquisition unit 22 shown in FIG. 5 includes an image acquisition section 46, a photographer information acquisition section 96, an evaluation information acquisition section 48, and a message acquisition section 50.

The image acquisition section 46 acquires a plurality of images (image group) transmitted through the network 16 from the terminal devices 14 of two or more participating users for a predetermined period, in the case of the present embodiment, a period until the deadline for images and messages for writing set by the schedule setting section 36 after the invitation letter is sent. In addition, the image acquisition section 46 acquires the profile image of each participating user set by the participating user.

The image acquisition section 46 acquires a plurality of images (image group) transmitted through the network 16 from the terminal devices 14 of the participating users. Then, the image acquisition section 46 stores the images so as to be associated with information indicating from which participating users the plurality of images have been transmitted. Also for the profile images transmitted through the network 16 from the terminal devices 14 of the participating users, the image acquisition section 46 stores the profile images so as to be associated with information indicating from which participating users the profile images have been transmitted.

Subsequently, the photographer information acquisition section 96 acquires photographer information, which is information of a photographer who has captured each of the plurality of images acquired by the image acquisition section 46, through the network 16 from the terminal devices 14 of two or more participating users.

Subsequently, the evaluation information acquisition section 48 acquires evaluation information indicating evaluation for each image given by two or more participating users, through the network 16, from the terminal devices 14 of the two or more participating users for the same predetermined period.

The evaluation information of an image is information indicating the evaluation of each participating user for each image, for example, high evaluation or low evaluation.

Subsequently, the message acquisition section 50 acquires the message for writing uploaded by each participating user from the terminal device 14 of each participating user through the network 16 for the same predetermined period.

For the messages for writing transmitted through the network 16 from the terminal devices 14 of the participating users, the message acquisition section 50 stores the messages for writing so as to be associated with information indicating from which participating users the messages for writing have been transmitted.

Figure 6:
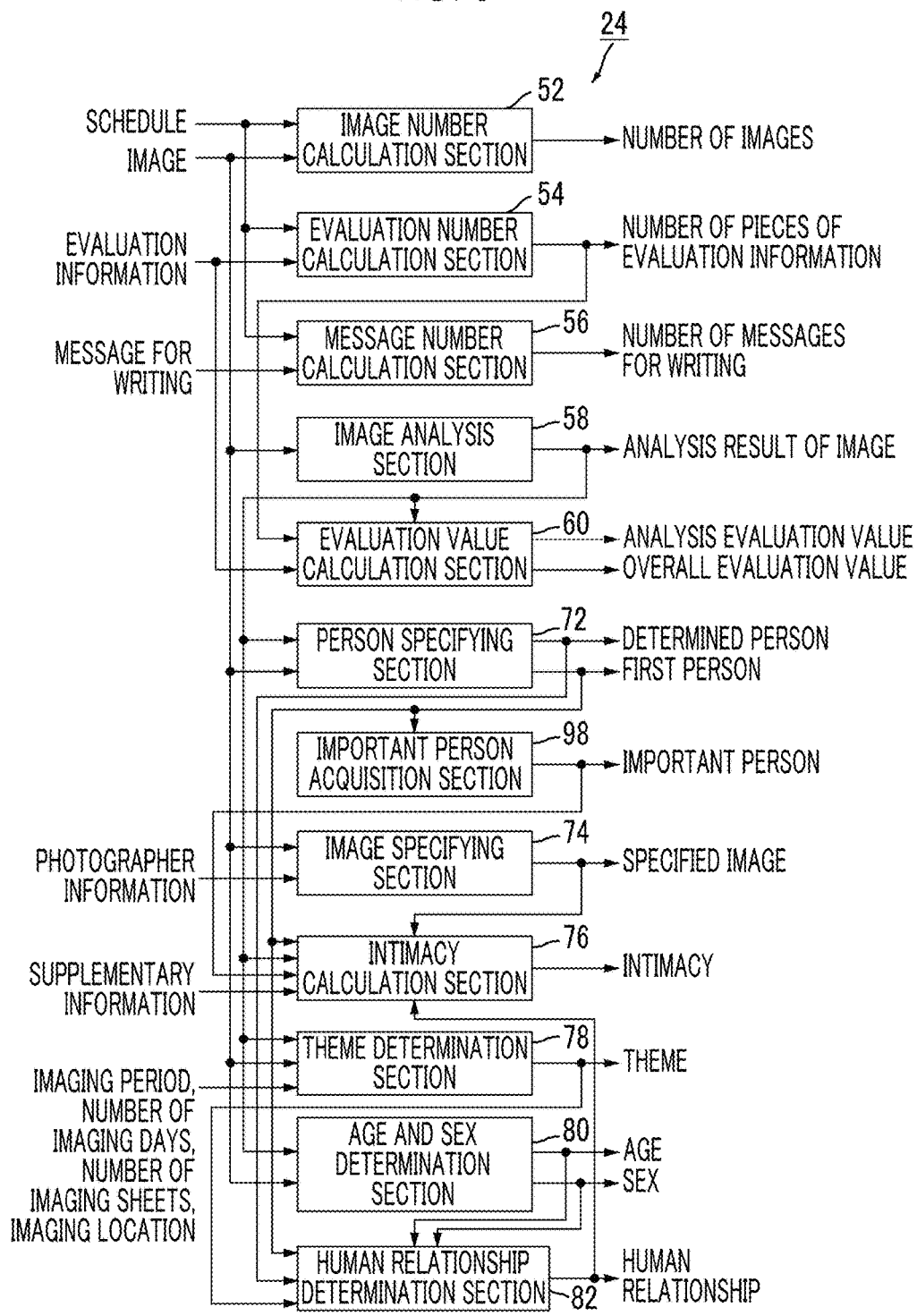
FIG. 6 is a block diagram of an embodiment showing the configuration of a data analysis unit shown in FIG. 2.

FIG. 6 is a block diagram of an embodiment showing the configuration of the data analysis unit shown in FIG. 2. The data analysis unit 24 shown in FIG. 6 includes an image number calculation section 52, an evaluation number calculation section 54, a message number calculation section 56, an image analysis section 58, an evaluation value calculation section 60, a person specifying section 72, an important person acquisition section 98, an image specifying section 74, an intimacy calculation section 76, a theme determination section 78, an age and sex determination section 80, and a human relationship determination section 82.

The image number calculation section 52 calculates the number of images acquired by the image acquisition section 46 after a predetermined period has passed since the invitation letter was sent by the upload prompting section 44, that is, after the deadline for images and messages for writing has passed.

Subsequently, the evaluation number calculation section 54 calculates the number of pieces of evaluation information indicating high evaluation and low evaluation, which have been acquired by the evaluation information acquisition section 48, after the deadline for images and messages for writing has passed.

Subsequently, the message number calculation section 56 calculates the number of messages for writing acquired by the message acquisition section 50 after the deadline for images and messages for writing has similarly passed.

Subsequently, the image analysis section 58 analyzes the contents of each image acquired by the image acquisition section 46. In the case of the present embodiment, the image analysis section 58 performs image analysis whenever an image is acquired by the image acquisition section 46.

For example, the image analysis section 58 analyzes the brightness or hue of an image, the degree of blurring, accessory information of each image, and the like. Note that blurring occurs in a case the subject is out of focus at the time of shooting, or in a case the subject moves when the shutter speed is relatively slow for example. In addition, in a case where a person's face is included in the image, the image analysis section 58 analyzes the size of the face, position of the face, direction of the face, skin color of the face, facial expression such as a smiling face, eye line, the number of persons included in the image, positional relationship of persons, and the like. The image analysis is processed by using a classifier acquired by a machine learning method such as SVM, Real AdaBoost, AdaBoost, and feature amount such as wavelet, Haar-like, Edgelet, EOH, and HOG for example.

For example, the accessory information of an image is header information, such as exchangeable image file format (Exif), and includes information of imaging date and time, an imaging position (global positioning system (GPS) information), an imaging distance, a photographer, and the like.

Subsequently, the evaluation value calculation section 60 calculates the analysis evaluation value of each image based on the analysis result of each image by the image analysis section 58. In addition, based on the evaluation information indicating high evaluation and low evaluation for each image acquired by the evaluation information acquisition section 48, the evaluation value calculation section 60 calculates an overall evaluation value of each image by adding or subtracting a value to or from the analysis evaluation value of each image or by giving a weighting to the analysis evaluation value of each image.

The evaluation value calculation section 60 can calculate an overall evaluation value of each image, for example, by adding a value to the analysis evaluation value of each image based on the number of pieces of evaluation information indicating high evaluation, which has been calculated by the evaluation number calculation section 54, and subtracting a value from the analysis evaluation value of each image based on the number of pieces of evaluation information indicating low evaluation.

Since the analysis evaluation value of each image is calculated based on the analysis result of the image, the analysis evaluation value of the image is a reference for determining whether or not the image is good or poor. Accordingly, it can be said that the higher the analysis evaluation value, the higher the image quality.

Since the overall evaluation value of an image is calculated based not only on the analysis result of the image but also on evaluation information indicating high evaluation and low evaluation that is given by the participating user, the overall evaluation value of the image is a reference for determining the preference of the participating user in addition to the good or bad of the image. Accordingly, it can be said that the higher the overall evaluation value, the higher the image quality or the more favorite image of the participating user.

Subsequently, the person specifying section 72 determines a person (person to be determined) appearing in each image based on the analysis result of each image. One or more first persons among the determined persons are specified. For example, a central person among the determined persons is specified.

The person specifying section 72 can determine each person appearing in a plurality of images, for example, by detecting the face area of each person from each image, comparing the detected face areas of respective persons, and performing same person determination processing for determining whether or not the persons are the same person. Among the plurality of determined persons, a person with the largest number of face area detections in a plurality of images, that is, one or more persons whose appearance frequency in a plurality of images exceeds a threshold value, can be specified as a central person.

For example, in a case where a plurality of images are a group of images showing a family, the central person is parents, a baby, and the like. In a case where a plurality of images are a group of images of a wedding reception, the central person is two of the bride and groom, parents, relatives, and the like. In a case where a plurality of images are a group of images of an elementary school entrance ceremony for only son, the central person is the son, parents, and the like. In a case where a plurality of images are a group of images of a trip of four friends, it can be thought that all of the four friends are central persons or there is no central person.

Subsequently, the important person acquisition section 98 acquires an important person among the first persons specified by the person specifying section 72.

Important persons are one or more persons of particular importance among the first persons. In a case where a plurality of images are a group of images showing a family, for example, parents and a baby, among persons appearing in the plurality of images are central persons. Among them, the baby is an important person. In a case where a plurality of images are a group of images of a wedding reception, for example, two of the bride and groom, parents, and relatives, among persons appearing in the plurality of images are central persons. Among them, the two of the bride and groom are important persons.

The important person acquisition section 98 may automatically acquire the information of important persons from a plurality of images based on the analysis result of each image, or the creator of a composite image, for example, a secretary user may manually designate the information of important persons.

Then, the image specifying section 74 specifies an image (specific image) captured by each of a plurality of photographers corresponding to a plurality of users, among the plurality of images, based on the photographer information of each image acquired by the photographer information acquisition section 96.

For example, the image specifying section 74 can specify an image captured by each photographer, among a plurality of images, based on the information of a photographer of each image included in the accessory information of each image. Alternatively, in a case where the image acquisition section 46 acquires each image from the terminal device 14 of each user, it can be determined that the user of each terminal device 14 from which each image has been acquired is each photographer who has captured each acquired image, and it is possible to specify an image captured by each photographer among the plurality of images.

Subsequently, the intimacy calculation section 76 calculates the intimacy between a first person and each photographer based on the presence of a first person in each image specified by the person specifying section 72 and the photographer information of each image acquired by the photographer information acquisition section 96.

The intimacy indicates the degree of friendliness between the first person and each photographer. Therefore, it can be considered that a person having a higher intimacy, among a plurality of photographers, is more intimate with the first person.

Subsequently, the theme determination section 78 determines the theme of a plurality of images based on the analysis result of each image and at least one of the imaging period, the number of imaging days, the number of imaging sheets, and imaging locations of a plurality of images. In the case of dividing a plurality of images into a plurality of groups including images in which respective persons appear, the theme determination section 78 determines a sub-theme of the theme of the plurality of images based on the number of images in which respective persons included in each group appear.

For example, the imaging period of a plurality of images and the number of imaging days can be calculated based on the information of the imaging date and time of the accessory information of each image. In addition, the number of a plurality of images can be calculated by counting the number of a plurality of images acquired by the image acquisition section 46. The imaging locations of a plurality of images can be calculated based on the information of imaging positions included in the accessory information of each image.

The theme of a plurality of images is a keyword indicating the atmosphere or impression that the participating user feels when viewing the plurality of images, and a child, a trip, a wedding, a birthday, an athletic meet, and the like can be exemplified. The sub-theme of the theme of a plurality of images is a keyword indicating the theme in more detail. For example, in a case where the theme is a trip, a family trip and a trip of friends can be exemplified as the sub-theme. All themes do not include sub-themes, and there are also themes that do not include sub-themes.

Subsequently, the age and sex determination section 80 determines the age and sex of each person appearing in images included in each of a plurality of groups based on the analysis result of each image.

The age and sex determination section 80 can extract the feature amount of a face, for example, wrinkles of the outer corner of the eyes, sagging of the jaw, wrinkles under the eyes, wrinkles of the forehead, and color of the hair from the face area of a person, and determine the age of the person based on the extracted feature amount. It is possible to detect a face image matching the image of the face area of a relevant person among a plurality of face images of male and female registered in advance beforehand and to perform determination from the sex of the detected face image.

Subsequently, the human relationship determination section 82 determines the human relationship between the first person and each photographer based on at least one of the theme, the age of the person, the sex of the person, and a person appearing in an image captured by each photographer.

The method in which the person specifying section 72 determines each person appearing in a plurality of images and the method in which the person specifying section 72 specifies a central person among a plurality of determined persons are not particularly limited. The method in which the theme determination section 78 determines the theme of a plurality of images, the method in which the age and sex determination section 80 determines the age and sex of a person appearing in an image included in each group, and the method in which the human relationship determination section 82 determines the human relationship between the first person and each photographer are not particularly limited. It is not essential to divide a plurality of images into a plurality of groups including images, in which respective persons appear, either.

Figure 7:
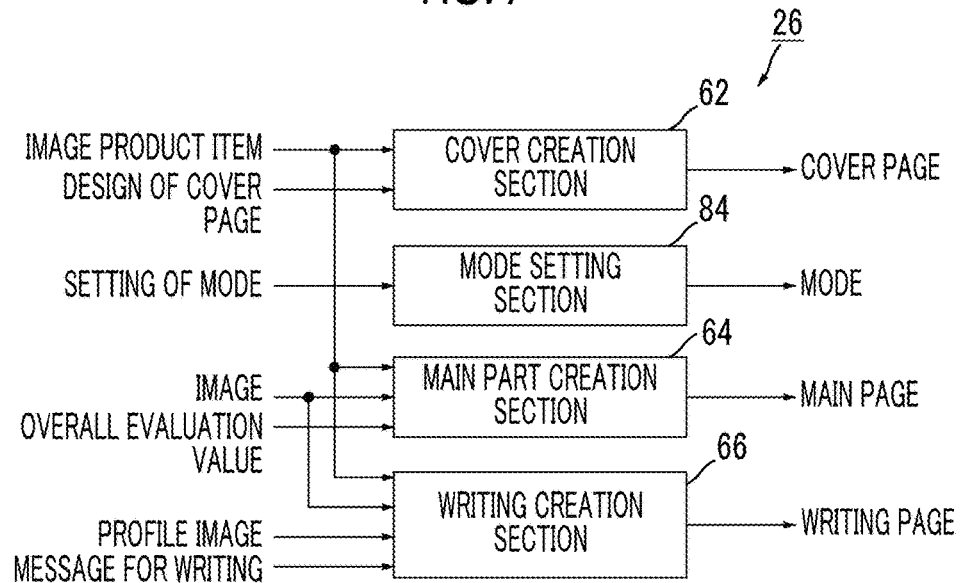
FIG. 7 is a block diagram of an embodiment showing the configuration of a composite image creation unit shown in FIG. 2.

Subsequently, FIG. 7 is a block diagram of an embodiment showing the configuration of the composite image creation unit shown in FIG. 2. The composite image creation unit 26 shown in FIG. 7 includes a cover creation section 62, a mode setting section 84, a main part creation section 64, and a writing creation section 66.

The cover creation section 62 creates a cover page of the design corresponding to the information of the product item stored in the setting storage section 38 and the information of the design of the cover page acquired by the cover design setting section 32.

Subsequently, the mode setting section 84 acquires the information of one mode of a private mode (first mode of the invention), a public mode (second mode of the invention), and a neutral mode (third mode of the invention) that is set by the first user of a plurality of users, for example, a secretary user, from the terminal device 14 of the first user through the network 16.

The private mode is a mode to extract a compositing target image, which is used in the creation of a composite image, from a plurality of images by giving priority to an image captured by a photographer with a high intimacy with the first person over an image captured by a photographer with a low intimacy with the first person.

The public mode is a mode to extract a compositing target image from a plurality of images by giving priority to an image captured by a photographer with a low intimacy with the first person over an image captured by a photographer with a high intimacy with the first person.

The neutral mode is a mode to extract a compositing target image from a plurality of images regardless of the intimacy between the first person and each photographer.

Subsequently, the main part creation section 64 creates main pages of the number of pages (pages other than the cover page and the writing page) corresponding to the information of the product item stored in the setting storage section 38 using a plurality of images acquired by the image acquisition section 46. The main part creation section 64 creates a composite image corresponding to the information of the product item stored in the setting storage section 38, in the case of the present embodiment, the main page of the photobook.

Figure 8:
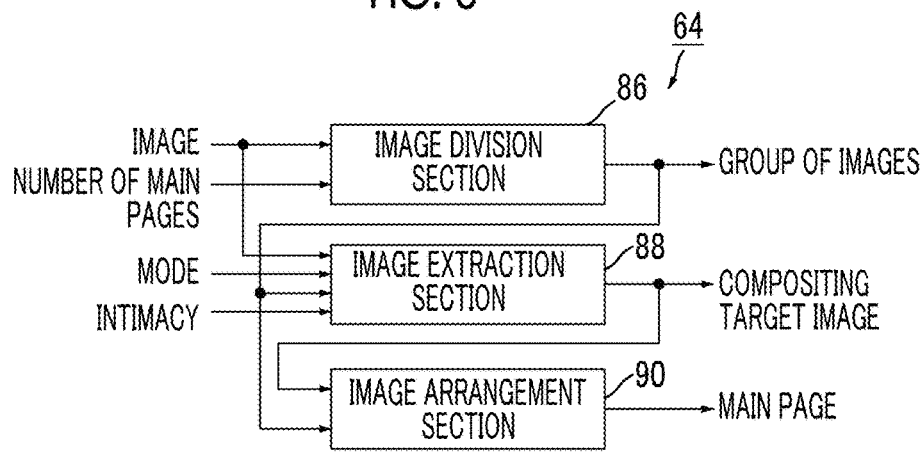
FIG. 8 is a block diagram of an embodiment showing the configuration of a main part creation section shown in FIG. 7.

As shown in FIG. 8, the main part creation section 64 includes an image division section 86, an image extraction section 88, an image arrangement section 90, and the like.

The image division section 86 divides a plurality of images acquired by the image acquisition section 46 into groups the number of which corresponds to the number of main pages.

The image extraction section 88 extracts, for each group of images, a plurality of compositing target images used in main pages, among images included in the group, based on the overall evaluation value of each image.

The image arrangement section 90 determines the size of each compositing target image extracted by the image extraction section 88 and the arrangement position in the main page, based on the overall evaluation value of each image, for each group of images, and arranges (automatically lays out) the compositing target images on the main pages of pages corresponding to the group of images.

Subsequently, the writing creation section 66 creates a writing page using a message for writing and a profile image of each participating user that have been acquired by the message acquisition section 50. The writing creation section 66 creates a writing page of the design corresponding to the information of the product item stored in the setting storage section 38 and the information of the design of the writing acquired by the writing design setting section 34.

Figure 9:
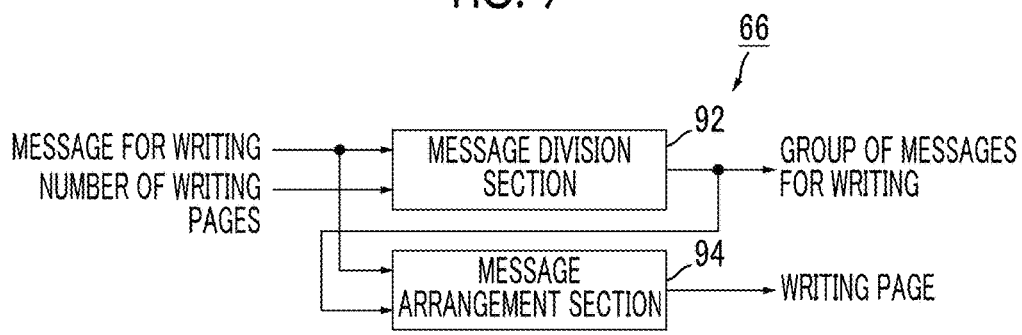
FIG. 9 is a block diagram of an embodiment showing the configuration of a writing creation section shown in FIG. 7.

As shown in FIG. 9, the writing creation section 66 includes a message division section 92, a message arrangement section 94, and the like.

The message division section 92 divides messages for writing acquired by the message acquisition section 50 into groups the number of which corresponds to the number of writing pages.

For each group of messages for writing, the message arrangement section 94 arranges a message for writing included in the group on the writing page of the page corresponding to the group of messages for writing.

The number of writing pages is set according to the number of participating users, the number of messages for writing, and the like. In addition, the number of main pages is set according to the number of pages of a composite image, the number of writing pages, and the like. In the case of the present embodiment, it is assumed that a 16-page photobook is created by setting the number of participating users to 2 to 36 persons and arranging 2 to 12 messages for writing on the writing page of one page.

Each section that forms the information setting unit 18, the information management unit 20, the data acquisition unit 22, the data analysis unit 24, and the composite image creation unit 26 is realized, for example, by causing a control device, such as a central processing unit (CPU), to execute a program loaded onto the memory. The data stored in each section is stored in a storage device, such as a hard disk drive (HDD), a solid state drive (SSD), and a secure digital (SD) memory, for example.

Figure 10:
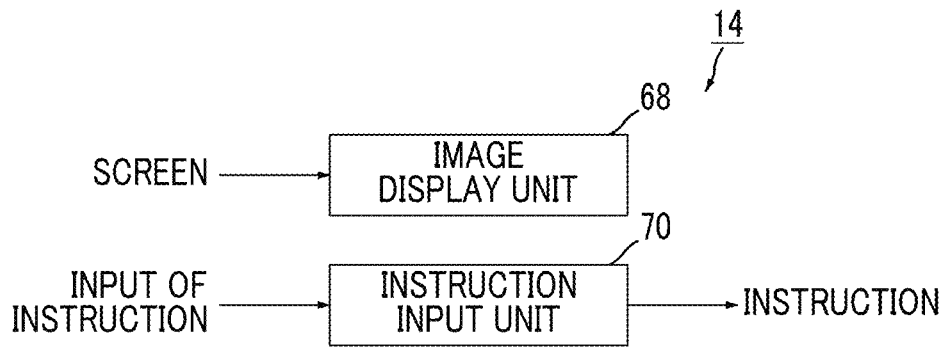
FIG. 10 is a block diagram of an embodiment showing the configuration of a terminal device of a user shown in FIG. 1.

Next, FIG. 10 is a block diagram of an embodiment showing the configuration of the terminal device of each user shown in FIG. 1. The terminal device 14 of each user shown in FIG. 10 includes the image display unit 68 and an instruction input unit 70.

In the terminal device 14, the image display unit 68 displays various setting screens, selection screens, check screens, input screens, creation screens, and the like, and is formed by a display device, such as a liquid crystal display, for example.

Subsequently, the instruction input unit 70 acquires various setting instructions, selection instructions, check instructions, input instructions, creation instructions, and the like input by the user, and is formed by input devices, such as a keyboard and a mouse.

In the case of the present embodiment, the image display unit 68 and the instruction input unit 70 are formed by a device in which a display device and an input device are integrated, such as a touch panel.

The number of terminal devices 14 corresponding to each user involved in the creation of a composite image does not necessarily to be one, and a plurality of terminal devices 14 may correspond to each user as long as the terminal devices 14 can correspond to the account of each user in the image processing apparatus 10.

Although not shown, each of the server 12 and the terminal device 14 includes, for example, a transmission and reception unit, which is a communication device for transmitting and receiving various kinds of data between the server 12 and the terminal device 14, and a control unit, which is a CPU for controlling the operation of each unit.

Figure 11:
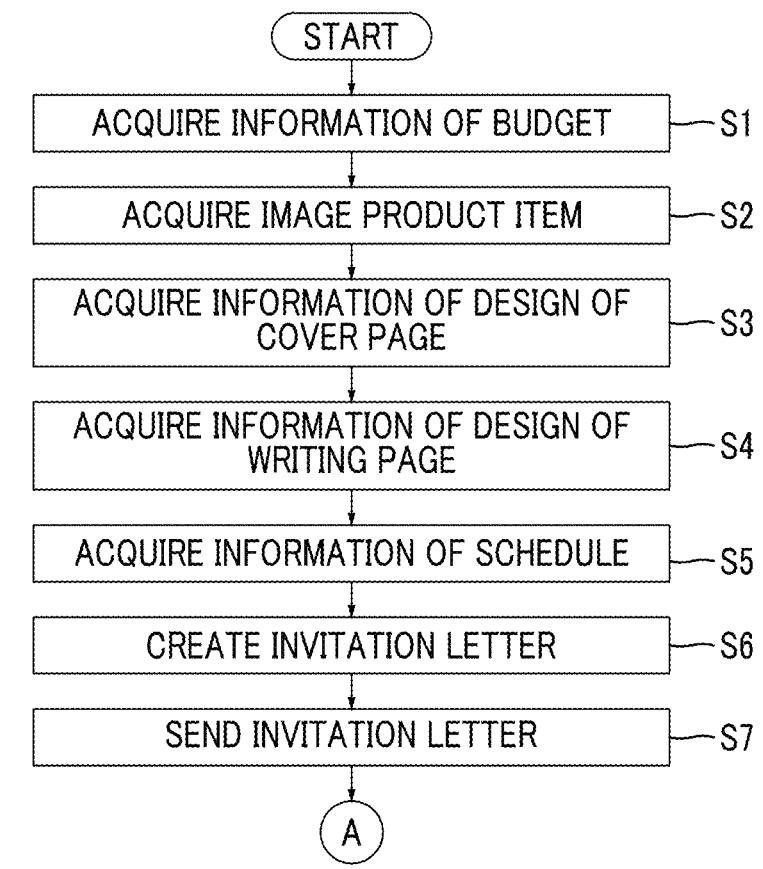
FIG. 11 is a flowchart of an embodiment showing the operation of the image processing apparatus shown in FIG. 1.
Figure 12:
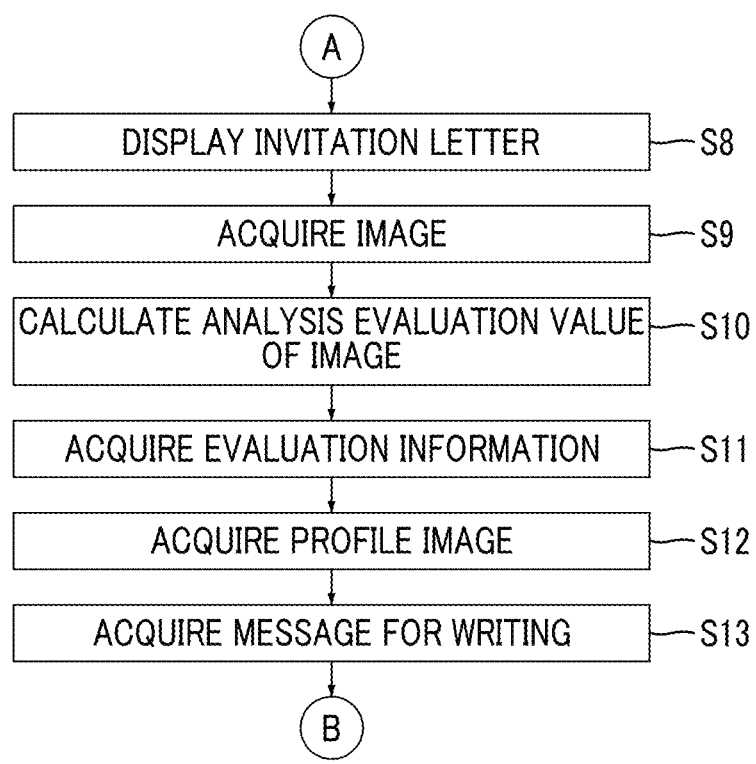
FIG. 12 is a flowchart of an embodiment showing the operation of the image processing apparatus subsequent to FIG. 11.
Figure 13:
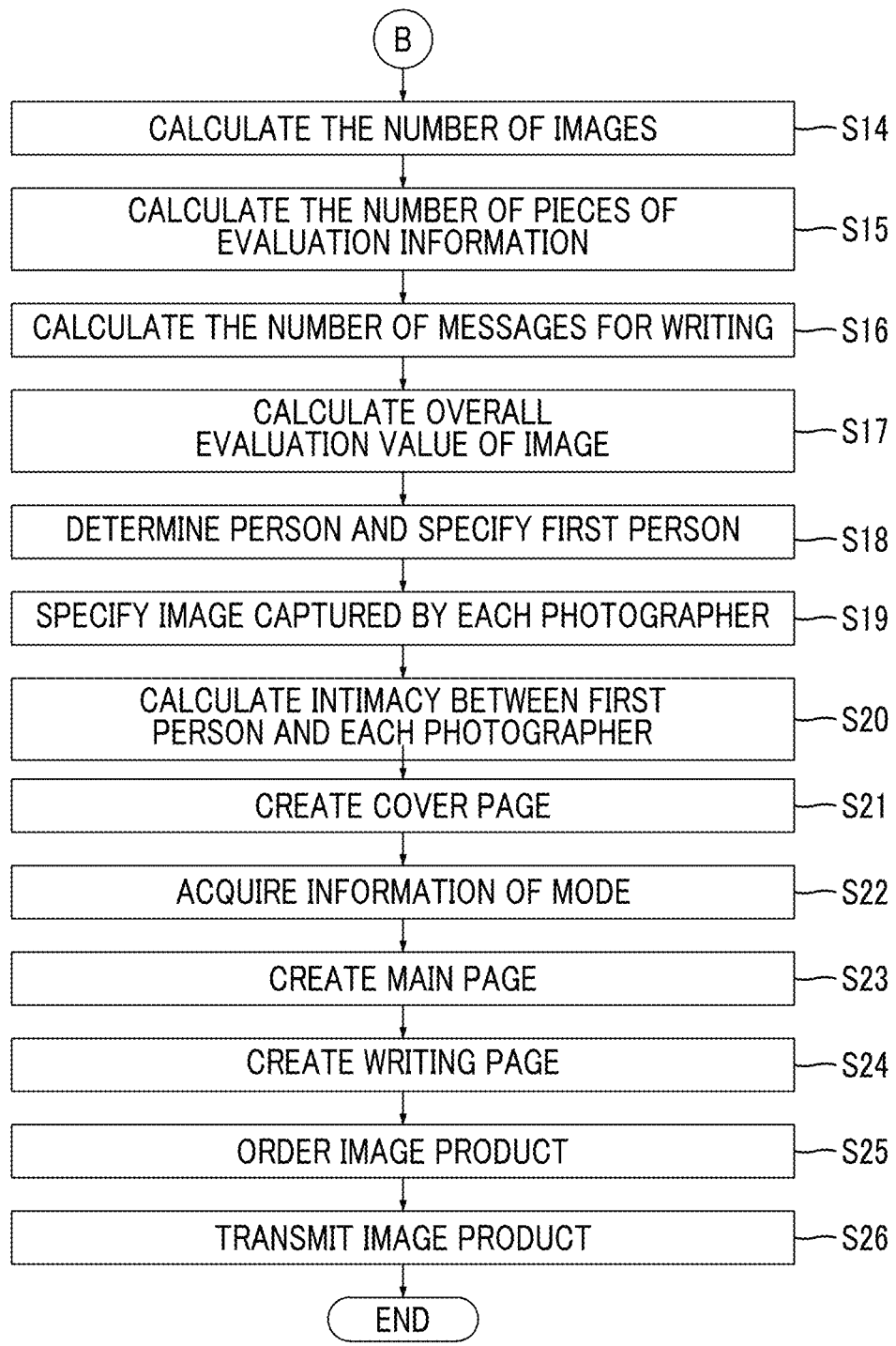
FIG. 13 is a flowchart of an embodiment showing the operation of the image processing apparatus subsequent to FIG. 12.

Next, the operation of the image processing apparatus 10 will be described with reference to flowcharts shown in FIGS. 11 to 13 and a display screen shown in FIGS. 14 to 36.

In the case of creating a composite image, first, a secretary user accesses a website for creating a composite image, which is provided by the image processing apparatus 10, through the instruction input unit 70 in the terminal device 14 of the secretary user.

Figure 14:
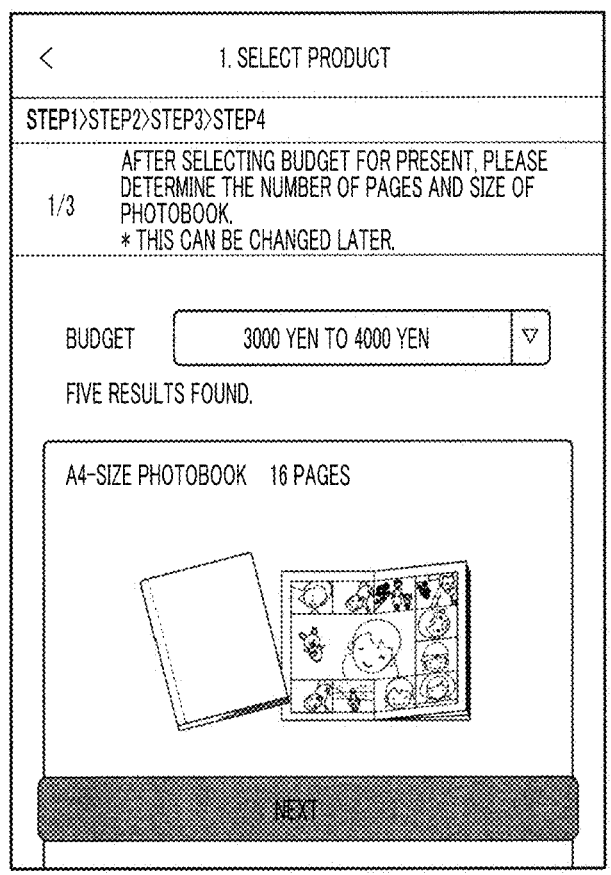
FIG. 14 is a conceptual diagram of an example showing a screen for setting a budget for a composite image.

When the secretary user accesses the website for creating a composite image, as shown in FIG. 14, a screen for setting a budget for the composite image is displayed on the image display unit 68 of the terminal device 14 of the secretary user by the budget setting section 28.

The secretary user sets a budget for the composite image to be created by the secretary user, through the instruction input unit 70, on the screen for setting the budget for the composite image. In the example shown in FIG. 14, a list of budgets for the composite image is registered in advance by the pull-down menu. The secretary user selects and sets one budget, for example, 3000 yen to 4000 yen, from the list of budgets for the composite image registered in the pull-down menu.

When the budget for the composite image is set, the information of the budget for the composite image set by the secretary user is acquired from the terminal device 14 of the secretary user by the budget setting section 28 (step S1).

Subsequently, one or more image product items corresponding to the information of the budget is presented by the product item acquisition section 30. In the example shown in FIG. 14, five photobooks having different sizes and number of pages are presented as image product items.

When the image product items are presented, a screen for setting one image product item among the one or more presented image product items is displayed on the image display unit 68 of the terminal device 14 of the secretary user by the product item acquisition section 30.

The secretary user selects and sets one image product item, among the one or more presented image product items, through the instruction input unit 70 on the screen for setting an image product item. In the example shown in FIG. 14, a 16-page photobook of A4 size is set.

After a photobook is set as an image product item, when a "Next" button is pressed, for example, when the "Next" button is tapped or clicked, one image product item set by the secretary user is acquired by the product item acquisition section 30 (step S2).

In addition, when a "<" button is pressed, it is possible to return to the previous screen. The same is true for subsequent screens.

Figure 15:
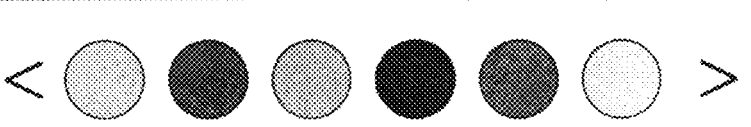
FIG. 15 is a conceptual diagram of an example showing a screen for setting the design of the cover page of a photobook.

Subsequently, as shown in FIG. 15, a screen for setting the design of the cover page of the photobook is displayed on the image display unit 68 of the terminal device 14 of the secretary user by the cover design setting section 32.

On the screen for setting the design of the cover page, the secretary user selects and sets the design of one cover page among the designs of one or more cover pages, in the example shown in FIG. 15, designs of three cover pages, through the instruction input unit 70. As the information of the design of the cover page of the photobook, for example, the secretary user can set the title of the photobook up to 20 characters to be described on the cover page and the color of the cover page.

After the design of the cover page is set, when the "Next" button is pressed, the information of the design of the cover page set by the secretary user is acquired from the terminal device 14 of the secretary user by the cover design setting section 32 (step S3).

Figure 16:
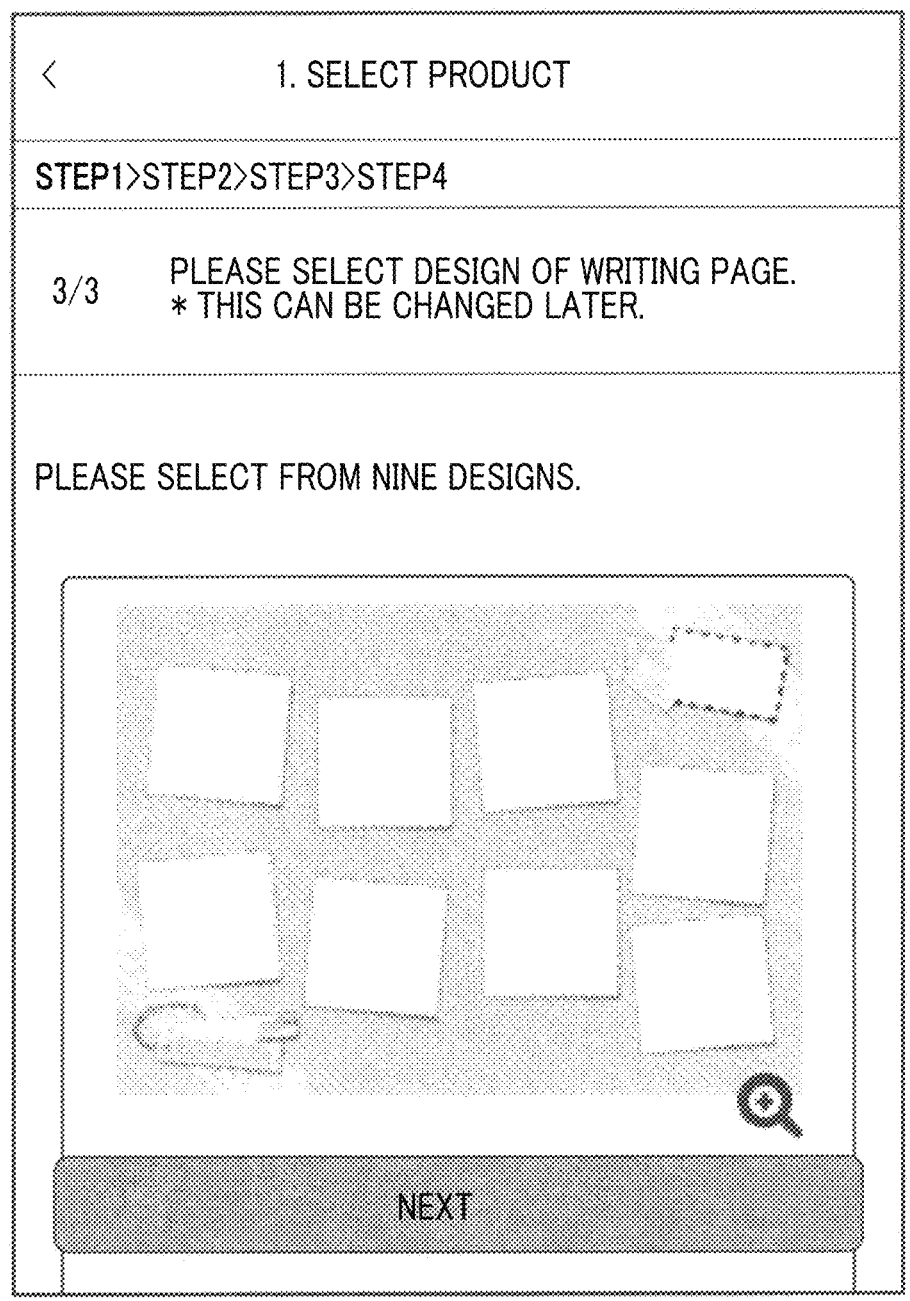
FIG. 16 is a conceptual diagram of an example showing a screen for setting the design of the writing page of a photobook.

Subsequently, as shown in FIG. 16, a screen for setting the design of the writing page of the photobook is displayed on the image display unit 68 of the terminal device 14 of the secretary user by the writing design setting section 34.

On the screen for setting the design of the writing page, the secretary user selects and sets one writing design among one or more writing designs, in the example shown in FIG. 16, nine writing designs, through the instruction input unit 70.

After the design of the writing page is set, when the "Next" button is pressed, the information of the design of the writing page set by the secretary user is acquired from the terminal device 14 of the secretary user by the writing design setting section 34 (step S4).

Figure 17:
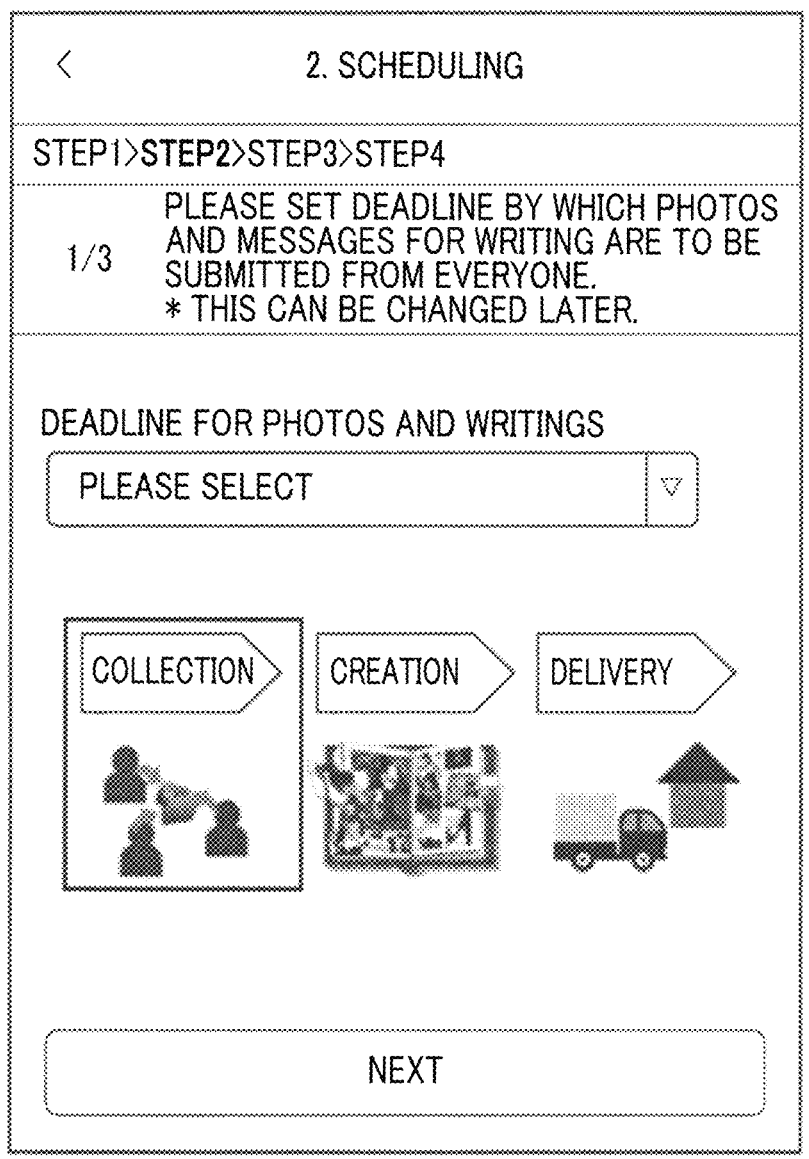
FIG. 17 is a conceptual diagram of an example showing a screen for setting the deadline for images and messages for writing.

Subsequently, as shown in FIG. 17, a screen for setting the deadline for images and messages for writing is displayed on the image display unit 68 of the terminal device 14 of the secretary user by the schedule setting section 36.

The secretary user sets the deadline for images and messages for writing, through the instruction input unit 70, on the screen for setting the deadline for images and messages for writing. In the example shown in FIG. 17, a list of dates within a predetermined period from the current date is registered in advance by the pull-down menu. The secretary user selects and sets one date, for example, December 2, as the deadline, from the list of dates registered in the pull-down menu.

After the deadline for images and messages for writing is set, when the "Next" button is pressed, the information of the deadline for images and messages for writing set by the secretary user is acquired from the terminal device 14 of the secretary user by the schedule setting section 36 (step S5).

Figure 18:
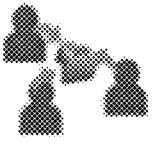
FIG. 18 is a conceptual diagram of an example showing a screen for setting a composite image creation period.

Subsequently, as shown in FIG. 18, a screen for setting a composite image creation period is displayed on the image display unit 68 of the terminal device 14 of the secretary user by the schedule setting section 36.

The secretary user sets a composite image creation period, through the instruction input unit 70, on the screen for setting the composite image creation period. In the example shown in FIG. 18, a list of dates within 30 days from the deadline for the period of images and messages for writing is registered in advance by the pull-down menu. The secretary user sets December 2 to 4 as a creation period by selecting one date, for example, December 4 from the list of dates registered in the pull-down menu.

After the composite image creation period is set, when the "Next" button is pressed, the information of the composite image creation period set by the secretary user is acquired from the terminal device 14 of the secretary user by the schedule setting section 36 (step S5).

Figure 19:
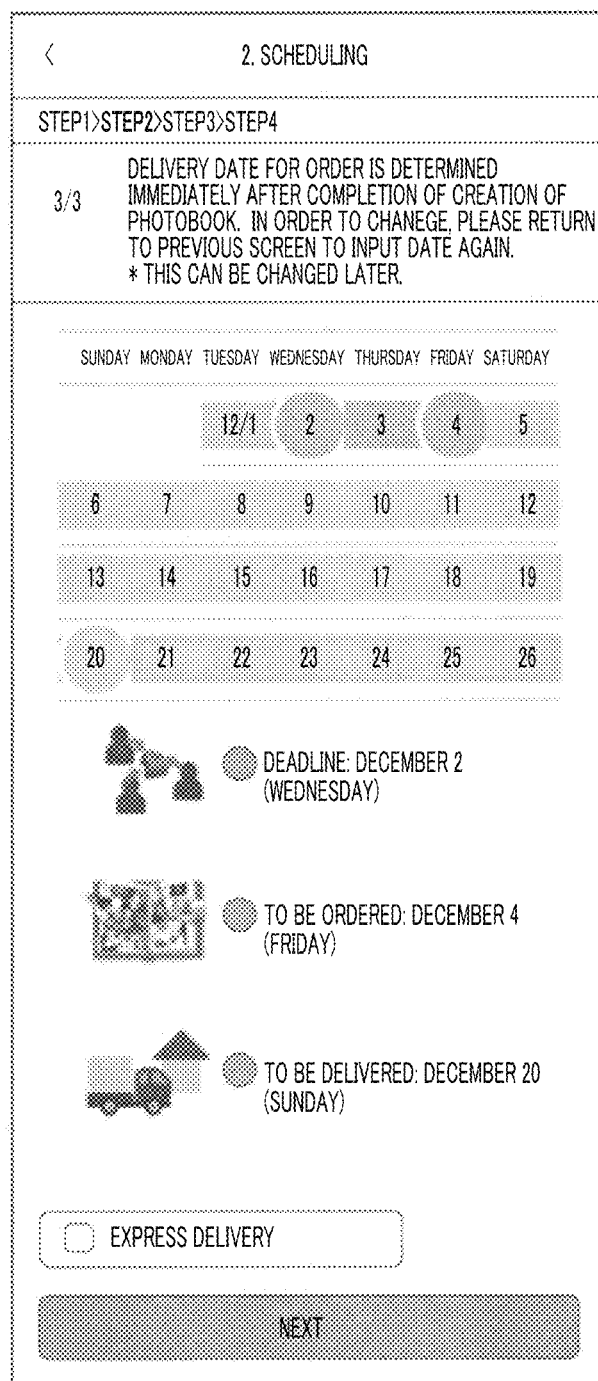
FIG. 19 is a conceptual diagram of an example showing a screen for setting the image product delivery date.

Subsequently, as shown in FIG. 19, a screen for setting the image product delivery date is displayed on the image display unit 68 of the terminal device 14 of the secretary user by the schedule setting section 36.

The image product delivery date is automatically set to a date after a predetermined period from the deadline of the composite image creation period, in the example shown in FIG. 19, December 20 after 16 days from December 4 that is the last day of the composite image creation period, by the schedule setting section 36.

The secretary user can change the image product delivery date, through the instruction input unit 70, on the screen for setting the image product delivery date. In the example shown in FIG. 19, it is possible to set the image product delivery date to a date before December 20, for example, by paying an extra fee and specifying the express finish.

After the image product delivery date is set, when the "Next" button is pressed, the information of the image product delivery date is acquired by the schedule setting section 36 (step S5).

In the case of creating a composite image using a plurality of images transmitted from the terminal devices 14 of the plurality of users, it is difficult to manage due dates. In the image processing apparatus 10, however, since it is possible to manage due dates, the burden on the secretary user can be reduced.

Figure 20:
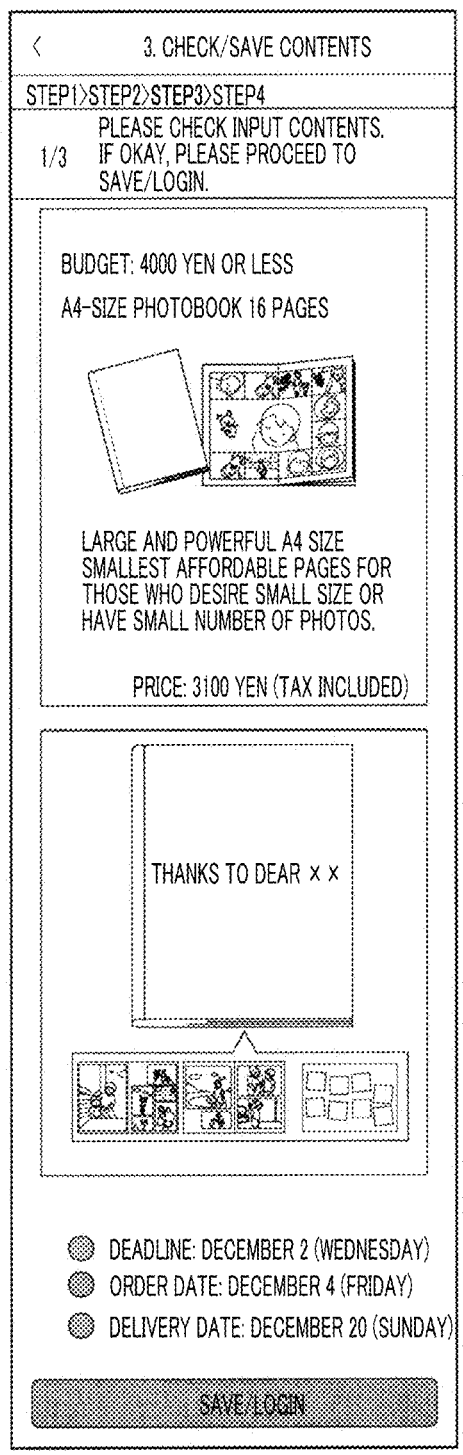
FIG. 20 is a conceptual diagram of an example showing a screen for checking the information of image product items and a schedule.

Subsequently, as shown in FIG. 20, a screen for checking the information of the image product item and the schedule is displayed on the image display unit 68 of the terminal device 14 of the secretary user by the setting storage section 38.

On the screen for checking the information of the image product item and the schedule, the secretary user checks the information of the image product item and the schedule. In a case where the setting is acceptable, a "Save/login" button is pressed to proceed to the next screen. In a case where it is necessary to change the setting, the "<" button is pressed to return to the previous screen.

Figure 21:
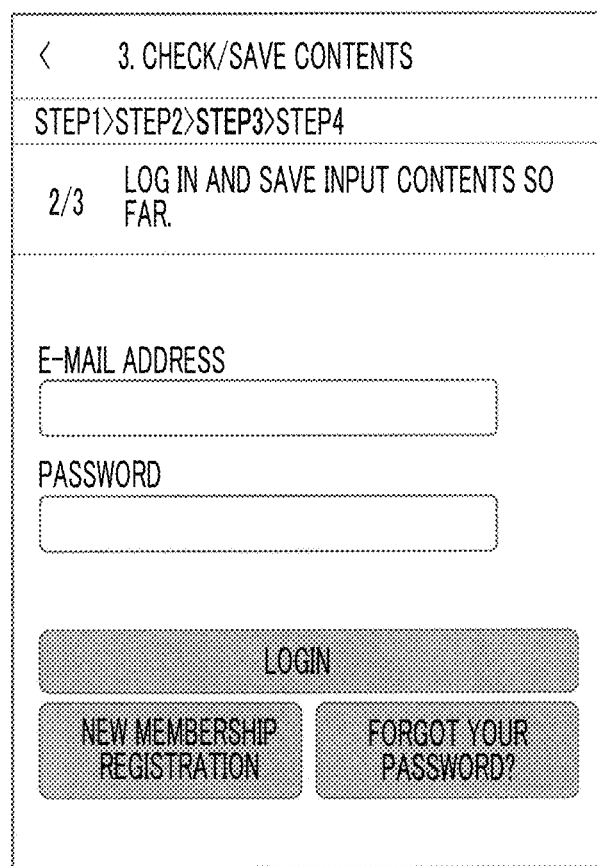
FIG. 21 is a conceptual diagram of an example showing a screen for inputting account information.

When the "Save/login" button is pressed, as shown in FIG. 21, a screen for the secretary user to input account information for logging in to the image processing apparatus 10 is displayed on the image display unit 68 of the terminal device 14 of the secretary user by the setting storage section 38.

The secretary user inputs the e-mail address of the secretary user and the secretary password, as account information for logging in to the image processing apparatus 10, through the instruction input unit 70. In a case where the secretary user has already completed membership registration to the image processing apparatus 10, a "Login" button is pressed. In a case where the secretary user has forgotten the secretary password after membership registration, processing for recovering the secretary password is performed by pressing a "Password forgot" button.

When the "Login" button is pressed, the account information already stored is compared with the account information input by the secretary user by the account information storage section 40. In a case where the account information already stored matches the account information input by the secretary user, the secretary user can log in to the image processing apparatus 10.

On the other hand, in a case where membership registration has not yet been completed, processing for new membership registration is performed by pressing a "New membership registration" button. When the "New membership registration" button is pressed, the e-mail address and the secretary password input by the secretary user are acquired and are stored as the account information of the secretary user by the account information storage section 40. After the membership registration is completed, the terminal device 14 of the secretary user can log in to the image processing apparatus 10.

Subsequently, the information of the image product item acquired by the product item acquisition section 30 and the schedule acquired by the schedule setting section 36 is stored by the setting storage section 38.

Figure 22:
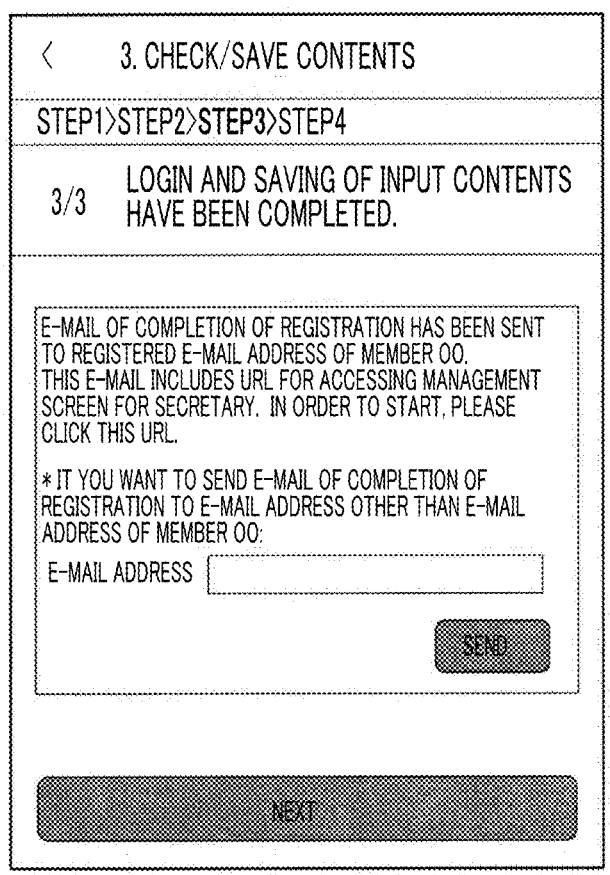
FIG. 22 is a conceptual diagram of an example showing a screen showing that the login of a secretary user and the storage of the information of image product items and the schedule have been completed.

Subsequently, as shown in FIG. 22, a screen showing that the login of the secretary user and the storage of the information of the image product item and the schedule have been completed is displayed on the image display unit 68 of the terminal device 14 of the secretary user by the setting storage section 38.

Subsequently, a message including the URL for accessing the management screen is transmitted by the management screen information transmission section 42. The message includes a notice indicating that the information of the image product item and the schedule has been stored.

In the example shown in FIG. 22, a message including the URL for accessing the management screen can be transmitted not only to the e-mail address of the secretary user but also to the e-mail address of participating users other than the secretary user, for example, the e-mail address of a deputy secretary user who acts as a secretary user, by inputting the e-mail address of participating users other than the secretary user through the instruction input unit 70.

Subsequently, when the "Next" button is pressed, as shown in FIG. 23, a screen for creating an invitation letter to be sent to the terminal device 14 of the participating user is displayed on the image display unit 68 of the terminal device 14 of the secretary user by the upload prompting section 44.

On the screen for creating an invitation letter, the secretary user inputs a message included in the invitation letter within a predetermined number of characters, in the example shown in FIG. 23, 150 characters, through the instruction input unit 70. In the example shown in FIG. 23, an initial message "Let's make a photobook with your photos and messages!" is automatically input. Therefore, it is possible to save the time and effort for the secretary user to input a message. The secretary user may use the initial message as it is, or may input other messages.

When the "Next" button is pressed, the information of a message included in the invitation letter is acquired by the upload prompting section 44, so that the invitation letter is created (step S6).

Figure 24:
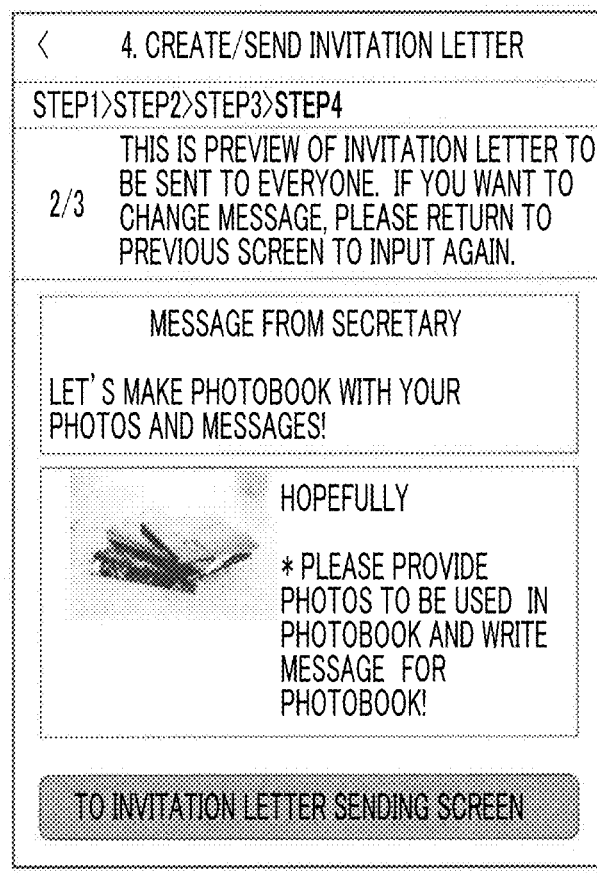
FIG. 24 is a conceptual diagram of an example showing a screen for checking the contents of the invitation letter.

Subsequently, as shown in FIG. 24, a screen for checking the contents of the invitation letter is displayed on the image display unit 68 of the terminal device 14 of the secretary user by the upload prompting section 44.

On the screen for checking the contents of the invitation letter, the secretary user checks the contents of the invitation letter. In a case where the contents are acceptable, a "To invitation letter send screen" button is pressed to proceed to the next screen. In a case where it is necessary to change the content, the "<" button is pressed to return to the previous screen.

When the "To invitation letter send screen" button is pressed, as shown in FIG. 25, a screen for sending an invitation letter to the terminal device 14 of the participating user is displayed on the image display unit 68 of the terminal device 14 of the secretary user by the upload prompting section 44.

On the screen for sending an invitation letter, the secretary user selects, as means for sending an invitation letter, in the example shown in FIG. 25, an SNS message or e-mail, through the instruction input unit 70. The invitation letter is sent to the SNS account of the participating user as an SNS message in a case where an "SNS" button is pressed, and is transmitted to the e-mail address of the participating user by e-mail in a case where an "E-mail" button is pressed.

The secretary user may send the invitation letter to all participating users involved in the creation of a composite image, or may send the invitation letter to only some participating users.

The SNS message or the e-mail includes not only the invitation letter but also images used in a composite image, evaluation information of images, an invitation URL for accessing the screen for each participating user to upload messages for writing or the like, and a common password (in the example shown in FIG. 25, "5865").

When the "Next" button is pressed, the invitation letter is sent to the terminal device 14 of each participating user by the upload prompting section 44 (step S7).

Each participating user receives the invitation letter through the terminal device 14 of the participating user, and accesses a website indicated by the invitation URL through the instruction input unit 70.

Figure 26:
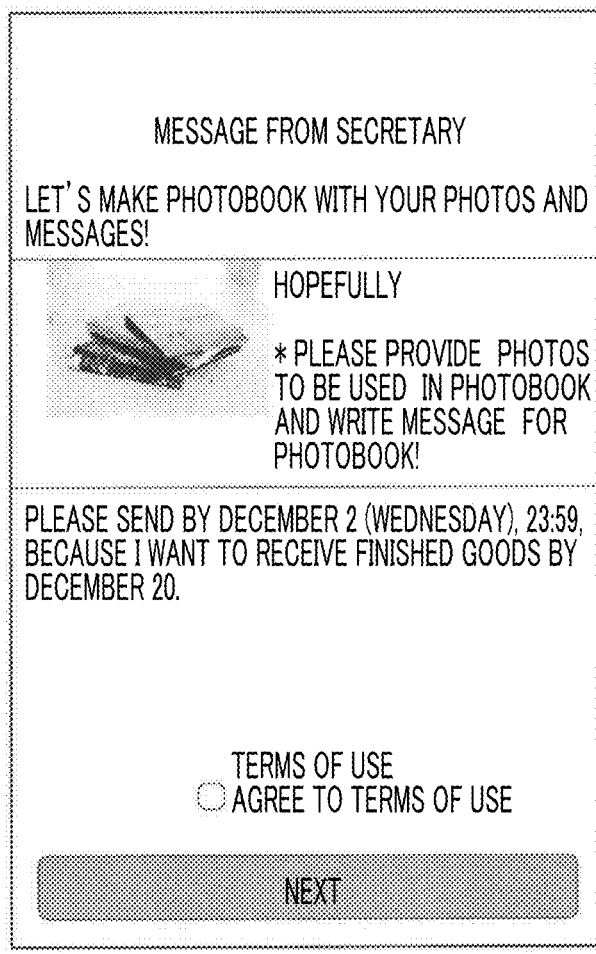
FIG. 26 is a conceptual diagram of an example showing a screen showing the received invitation letter.

When the participating user accesses the website indicated by the invitation URL, as shown in FIG. 26, a screen showing the received invitation letter is displayed on the image display unit 68 of the terminal device 14 of the participating user by the upload prompting section 44 (step S8).

In the invitation letter, in addition to the message from the secretary user, uploading images and messages for writing used in the composite image and information on the deadline (in the case of the present embodiment, 23:59 on Wednesday, December 2) are displayed as a request for participating users.

Each participating user views the screen showing the invitation letter to understand that the request to the participating user from the secretary user is the upload of images and messages for writing to be made as a photobook and that the deadline is December 2.

Figure 27:
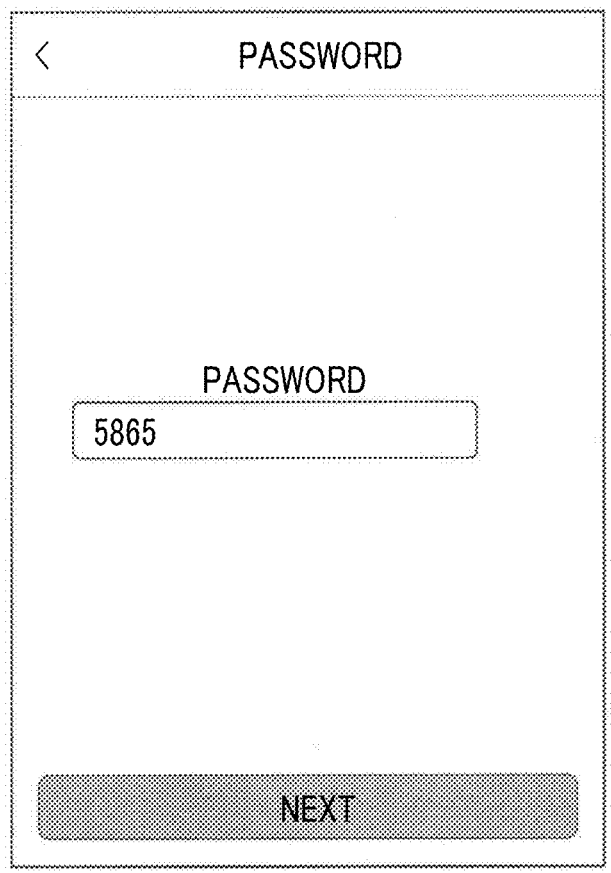

Subsequently, when a check box of "agree with terms and conditions" is checked and the "Next" button is pressed, as shown in FIG. 27, a screen for inputting a common password for accessing a screen for the participating user to upload images used in the composite image, evaluation information of images, messages for writing, and the like is displayed on the image display unit 68 of the terminal device 14 of the participating user by the account information storage section 40.

On the screen for inputting a common password, the participating user inputs the common password included in the received invitation letter (in the example shown in FIG. 27, "5865") through the instruction input unit 70.

Figure 28:
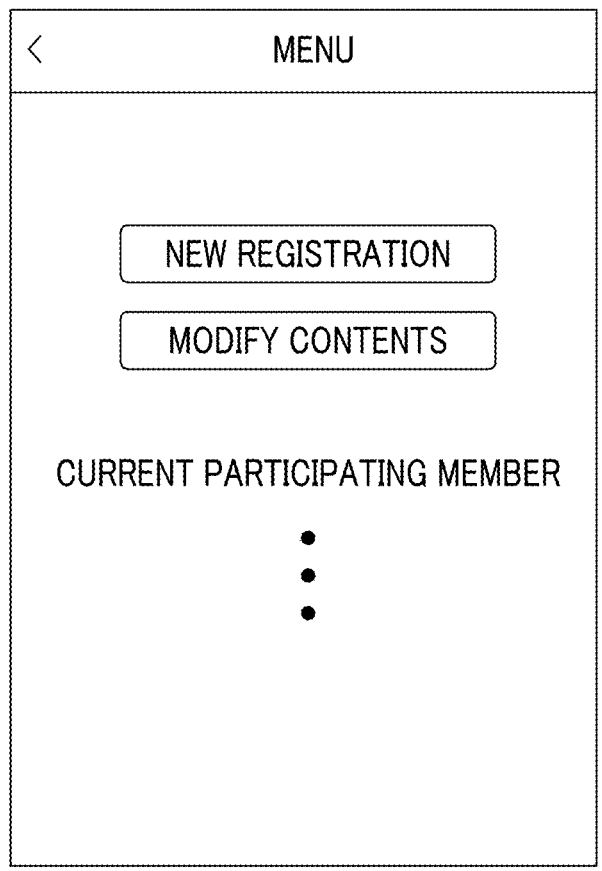
FIG. 28 is a conceptual diagram of an example showing a screen for registering a new participating user.

When the common password is input and the "Next" button is pressed, as shown in FIG. 28, a screen for registering a new participating user is displayed on the image display unit 68 of the terminal device 14 of the participating user by the account information storage section 40.

On the screen for registering a new participating user, the name of a user (current participating member) who is already registered as a participating user is displayed. It is not essential to display the names of registered participating users. However, by displaying the names of registered participating users, in a case where a user registers a participating user newly, the user can register the participating user with confidence if the name that the user knows is included in the names of the registered participating users.

Each participating user presses a "New registration" button in a case where the participating user has not yet been registered in the image processing apparatus 10, and presses "Modify contents" in a case where the participating user has already been registered in the image processing apparatus 10.

When the "New registration" button is pressed, as shown in FIG. 29, a screen for registering a name and an individual password (in FIG. 29, displayed as "secret code") to be registered as a participating user is displayed on the image display unit 68 of the terminal device 14 of the participating user by the account information storage section 40.

The participating user inputs a real name or nickname as a name and inputs an arbitrary character string as a secret code through the instruction input unit 70.

The name and the secret code of the participating user are account information of the participating user. As shown in FIG. 28, the participating user can modify images, evaluation information of images, messages for writing, and the like, which have already been uploaded, by pressing the "Modify contents" button on the screen for registering a new participating user and inputting the name and the secret code that have already been registered.

When the name and the secret code of the participating user are input and the "Next" button is pressed, the name and the secret code of the participating user are acquired and are stored as the account information of the participating user by the account information storage section 40.

Figure 30:
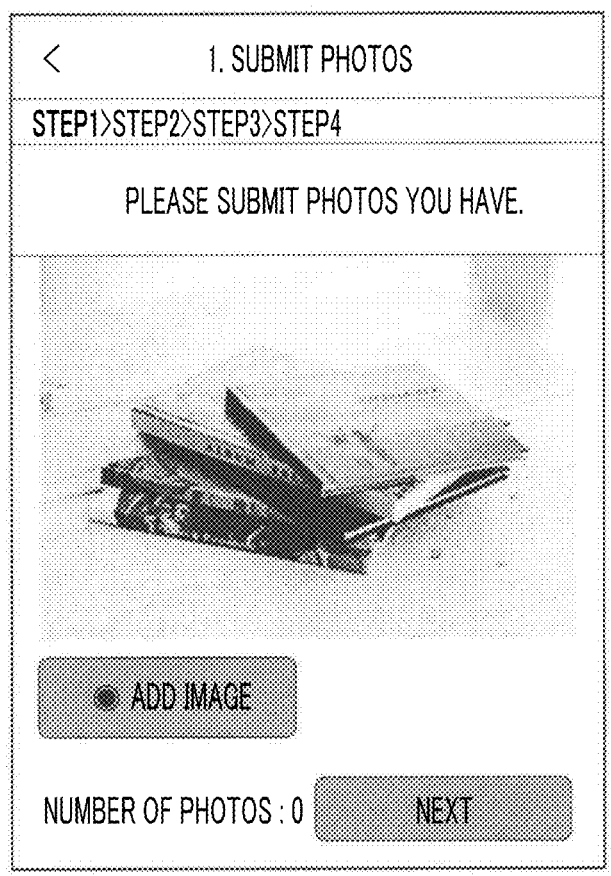
FIG. 30 is a conceptual diagram of an example showing a screen for a participating user to select an image to be uploaded.

Subsequently, as shown in FIG. 30, a screen for selecting an image uploaded by the participating user is displayed on the image display unit 68 of the terminal device 14 of the participating user by the image acquisition section 46.

The participating user can select an image to be uploaded by pressing an "Add image" on the screen for selecting an image to be uploaded. The number of images selected by the participating user is displayed on the screen for selecting an image to be uploaded.

After an image to be uploaded is selected, when the "Next" button is pressed, the image uploaded from the participating user, that is, the image submitted from the terminal device 14 of the participating user is acquired by the image acquisition section 46 (step S9). Thus, the image acquisition section 46 acquires a plurality of images transmitted from the terminal devices 14 of two or more participating users. Whenever an image is acquired by the image acquisition section 46, the image is analyzed by the image analysis section 58, and the analysis evaluation value of the image is calculated based on the analysis result of the image by the evaluation value calculation section 60 (step S10).

Figure 31:
FIG. 31 is a conceptual diagram of an example showing a screen for evaluating each of a plurality of images transmitted from terminal devices of two or more participating users.

Subsequently, as shown in FIG. 31, a screen for evaluating each of the plurality of images transmitted from the terminal devices 14 of two or more participating users is displayed on the image display unit 68 of the terminal device 14 of each participating user by the evaluation information acquisition section 48.

The participating user can give evaluation information indicating high evaluation or low evaluation to each image through the instruction input unit 70 on the screen for evaluating each image. For example, the participating user can view each image, and can give evaluation information indicating high evaluation to an image that the participating user likes by pressing a "Good" button and give evaluation information indicating low evaluation to an image that the participating user dislikes by pressing a "Not good" button.

When evaluation information indicating high evaluation and low evaluation is given to each image from the terminal device 14 of each participating user, the evaluation information indicating high evaluation and low evaluation given to each image is acquired from the terminal device 14 of the participating user by the evaluation information acquisition section 48 (step S11).

Figure 32:
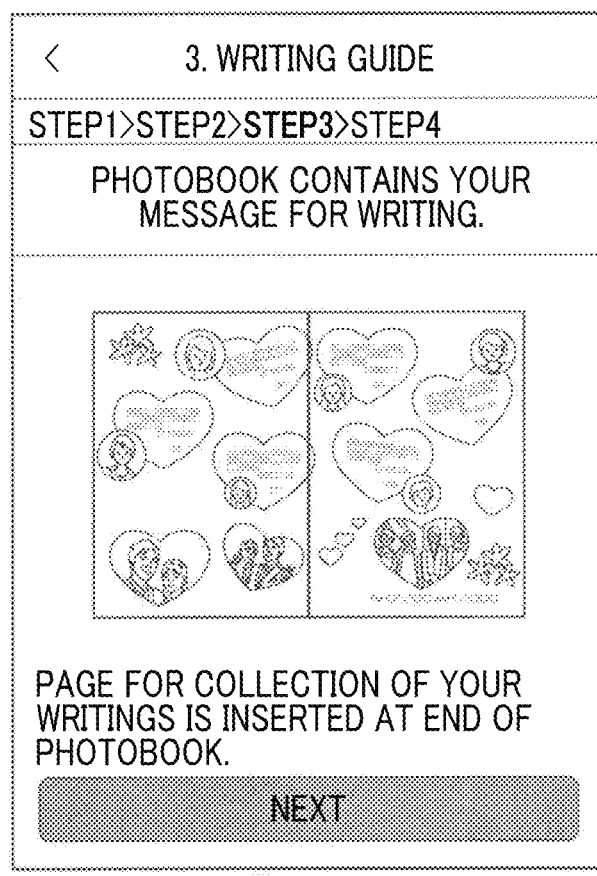
FIG. 32 is a conceptual diagram of an example showing a screen for notifying that a writing page has been inserted at the end of the photobook.

After the evaluation information is given, when the "Next" button is pressed, as shown in FIG. 32, a screen notifying that a writing page has been inserted at the end of the photobook is displayed on the image display unit 68 of the terminal device 14 of the participating user by the message acquisition section 50.

The participating user views and checks the screen notifying that a writing page has been inserted at the end of the photobook.

Figure 33:
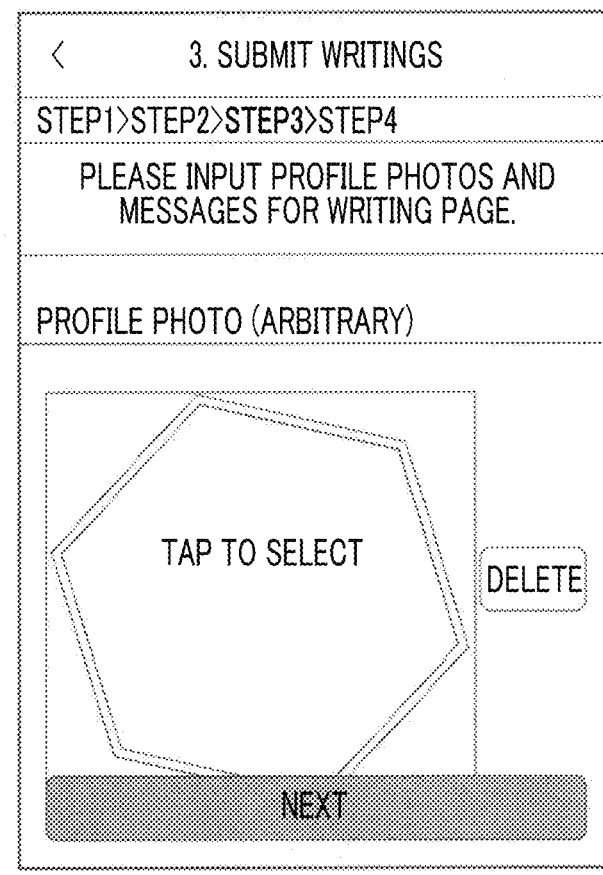
FIG. 33 is a conceptual diagram of an example showing a screen for setting a profile image of a participating user used in a writing page.

Subsequently, when the "Next" button is pressed, as shown in FIG. 33, a screen for setting the profile image of the participating user used in the writing page is displayed on the image display unit 68 of the terminal device 14 of the participating user by the message acquisition section 50.

By pressing the screen for setting a profile image, the participating user can select and set an image used as a profile image, among images owned by the participating user in the terminal device 14 of the participating user. In addition, the participating user can delete the already set profile image by pressing a "Delete" button, and can set the profile image again.

After the participating user has set the profile image, when the "Next" button is pressed, the profile image set by the participating user is acquired from the terminal device 14 of the participating user by the image acquisition section 46 (step S12).

Figure 34:
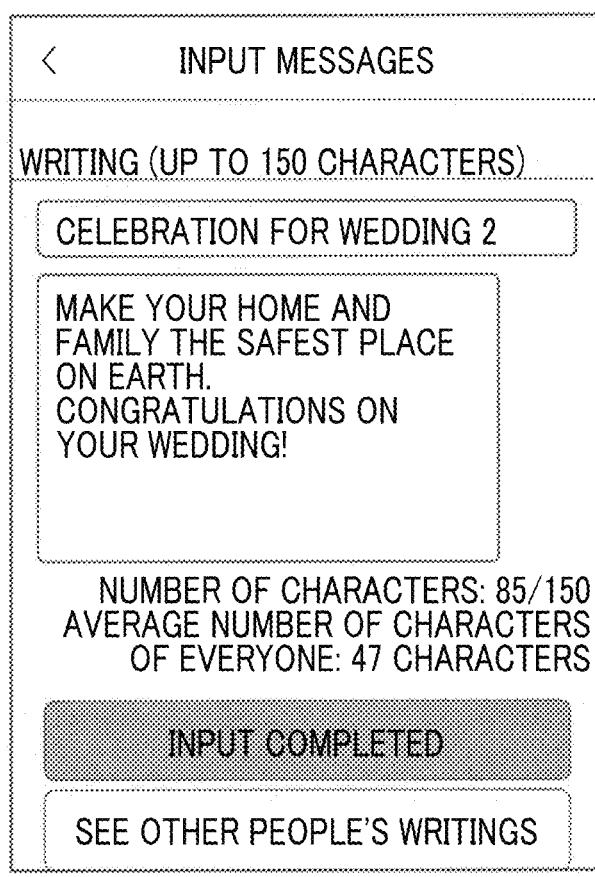
FIG. 34 is a conceptual diagram of an example showing a screen for inputting a message for writing.

Subsequently, as shown in FIG. 34, a screen for inputting a message for writing is displayed on the image display unit 68 of the terminal device 14 of the participating user by the message acquisition section 50.

On the screen for inputting a message for writing, the participating user inputs a message included in the writing page within 150 characters through the instruction input unit 70. In the example shown in FIG. 34, an initial message "Congratulations on your marriage. . . . Please be happy" is automatically input. Therefore, it is possible to save the time and effort for the participating user to input a message. The participating user may use the initial message as it is, or may input other messages.

In addition, each participating user can view messages for writing that other participating users have already uploaded by pressing a "See other people's writings" button on the screen for inputting a message for writing.

Figure 35:
FIG. 35 is a conceptual diagram of an example showing a screen for checking the message for writing input by the participating user.

After the participating user has input the message for writing, when an "Input completed" button is pressed, as shown in FIG. 35, a screen for checking the message for writing input by the participating user is displayed on the image display unit 68 of the terminal device 14 of the participating user by the message acquisition section 50.

On the screen for checking a message for writing, the participating user views and checks a message for writing. In a case where the message is acceptable, a "Submit" button is pressed to proceed to the next screen. In a case where it is necessary to change the message, the "<" button is pressed to return to the previous screen.

When the "Submit" button is pressed, a message for writing submitted by the participating user, that is, a message for writing uploaded from the terminal device 14 of the participating user, is acquired by the message acquisition section 50 (step S13).

Thus, in the case of creating a composite image, such as a photobook, using images of a plurality of users, it is possible to convey the feeling of each participating user to the recipient of the photobook as a message for writing by including not only the main page but also the writing page of the photobook.

Figure 36:
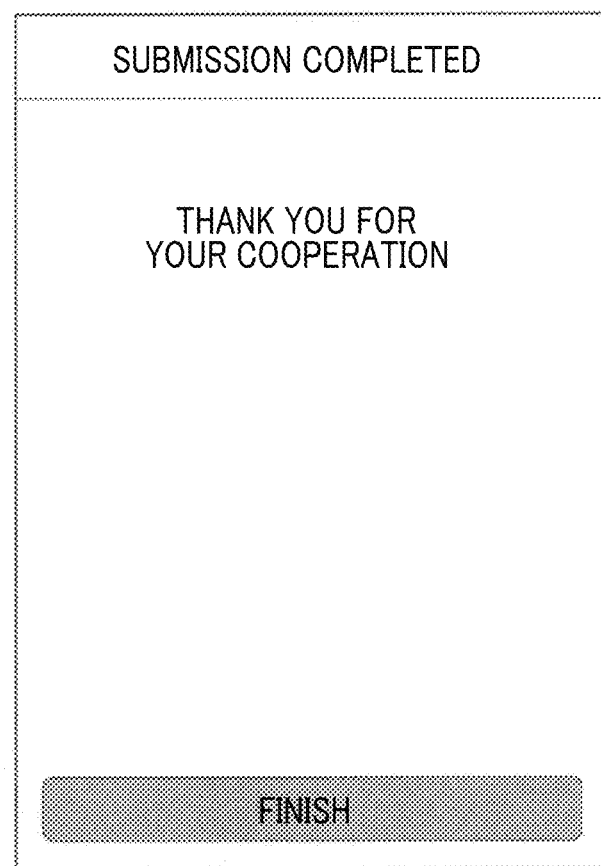
FIG. 36 is a conceptual diagram of an example showing a screen showing that the uploading of the message for writing has been completed.

Subsequently, as shown in FIG. 36, a screen showing that the message for writing has been submitted is displayed on the image display unit 68 of the terminal device 14 of the participating user.

Subsequently, when a "completed" button is pressed, the uploading of images, evaluation information of images, and messages for writing is completed.

Subsequently, when it is detected by the schedule setting section 36 that the deadline for images and messages for writing has passed, the number of images acquired by the image acquisition section 46 is calculated by the image number calculation section 52 (step S14). In addition, the number of pieces of evaluation information indicating high evaluation and low evaluation that has been acquired by the evaluation information acquisition section 48 is calculated by the evaluation number calculation section 54 (step S15), and the number of messages for writing acquired by the message acquisition section 50 is calculated by the message number calculation section 56 (step S16).

Subsequently, based on the evaluation information indicating high evaluation and low evaluation for each image, for example, the number of pieces of evaluation information, the evaluation value calculation section 60 adds or subtracts a value to or from the analysis evaluation value of each image to calculate the overall evaluation value of each image (step S17).

As described above, it is not essential to analyze an image and calculate the analysis evaluation value whenever an image is acquired. However, by analyzing an image and calculating the analysis evaluation value whenever an image is acquired, it is possible to calculate the overall evaluation value of an image in a short period of time compared with a case where all images are acquired and then the images are collectively analyzed to calculate the analysis evaluation value. As a result, it is possible to shorten the time taken to create a composite image.

Subsequently, the person specifying section 72 determines each of a plurality of persons appearing in a plurality of images based on the analysis result of each image. Among the plurality of determined persons, a first person, for example, a central person, is specified (step S18).

Subsequently, the image specifying section 74 specifies an image captured by each of a plurality of photographers corresponding to the plurality of users, among the plurality of images, based on the photographer information of each image (step S19).

Subsequently, the intimacy calculation section 76 calculates the intimacy between the first person and each photographer based on at least either the analysis result of the image captured by each photographer and the accessory information of the image captured by each photographer (step S20).

As already described, a photographer of an image does not appear in the image captured by the photographer in many cases. For this reason, the intimacy between persons that is calculated in consideration of only the contents of an image, that is, the analysis result of each image may be different from the actual intimacy between persons. In contrast, by calculating the intimacy between the first person and each photographer as in the image processing apparatus 10, it is possible to calculate the actual intimacy between persons appearing in a plurality of images.

For example, rather than a photographer whose proportion occupying an image exceeds a first threshold value or whose imaging distance is less than a second threshold value, that is, a photographer who has captured a small number of images, in which the first person appears, from above or from the short distance, the intimacy calculation section 76 can calculate a photographer who has captured a large number of images, in which the first person whose proportion occupying the image exceeds the first threshold value or whose imaging distance is less than the second threshold value appears, as a photographer with a high intimacy with the first person.

A photographer with a high intimacy with the first person can capture an image, in which the first person appears, from above or from the short distance, while a photographer with a low intimacy with the first person cannot capture an image, in which the first person appears, from above or from the short distance. That is, a photographer who has captured a larger number of images, in which the first person appears, from above or from the short distance can be said to be a photographer with a higher intimacy with the first person.

The distance may be calculated using any one of distance measurement methods shown in the following (1) to (4).

(1) A shortest distance obtained by specifying a region occupied by each person and connecting an imaging apparatus, such as a digital still camera, and the region occupied by each person to each other (2) A shortest distance obtained by specifying a region occupied by the face of each person and connecting an imaging apparatus and the region occupied by the face of each person to each other (3) A shortest distance obtained by specifying the center of gravity of a region occupied by each person and connecting an imaging apparatus and the center of gravity of the region occupied by each person to each other (4) A shortest distance obtained by specifying the center of gravity of a region occupied by the face of each person and connecting an imaging apparatus and the center of gravity of the region occupied by the face of each person to each other For the distance, any one of the distances shown in the following (1) to (3) may be used.

(1) The number of pixels in an image (2) The ratio of a short side or a long side in an image (3) Actual distance estimated from the size of the face of a person In addition, rather than a photographer who has captured a small number of images in which the first person having a specific facial expression different from the facial expression at the normal time, such as a sleeping face, a smiling face, a crying face, and an angry face, appears, the intimacy calculation section 76 can calculate a photographer who has captured a large number of images, in which the first person having a specific facial expression appears, as a photographer with a high intimacy with the first person.

A photographer with a high intimacy with the first person can capture a larger number of images in which the first person having a specific facial expression, such as a sleeping face, appears, but a photographer with a low intimacy with the first person can capture only a smaller number of images in which the first person having a specific facial expression appears. That is, a photographer who has captured a larger number of images, in which the first person of the sleeping face appears, can be said to be a photographer with a higher intimacy with the first person.

The intimacy calculation section 76 can calculate a photographer who has captured images in which the first person having many kinds of facial expressions appears, rather than a photographer who has captured images in which the first person having few kinds of facial expressions appears, as a photographer with a high intimacy with the first person.

A photographer with a high intimacy with the first person can capture images in which the first person having many kinds of facial expressions, such as a smiling face, a crying face, and an angry face, appears, but a photographer with a low intimacy with the first person can capture only images in which the first person having few kinds of facial expressions appears. That is, a photographer who has captured a larger number of images, in which the first person having many kinds of facial expressions appears, can be said to be a photographer with a higher intimacy with the first person.

The intimacy calculation section 76 can calculate a photographer who has captured a large number of images in which the first person appears, rather than a photographer who has captured a small number of images in which the first person appears, as a photographer with a high intimacy with the first person.

A photographer with a high intimacy with the first person can capture a larger number of images in which the first person appears, but a photographer with a low intimacy with the first person can capture only a smaller number of images in which the first person appears. That is, a photographer who has captured a larger number of images, in which the first person appears, can be said to be a photographer with a higher intimacy with the first person.

The intimacy calculation section 76 can calculate a photographer with a large number of days of capturing images in which the first person appears, rather than a photographer with a small number of days of capturing images in which the first person appears, as a photographer with a high intimacy with the first person.

A photographer with a high intimacy with the first person can capture images in which the first person appears for a larger number of days, but a photographer with a low intimacy with the first person can capture images in which the first person appears only a smaller number of days. That is, a photographer who has captured images in which the first person appears for a larger number of imaging days can be said to be a photographer with a higher intimacy with the first person, since the photographer is with the first person for a long time.

Even if photographers have captured the same number of images in which the first person appears, a photographer who has captured a large number of images in which the first person appears in the event of several days, such as a trip, that is, a photographer who has captured images in which the first person appears for a larger number of imaging days, rather than a photographer who has captured a large number of images in which the first person appears in the event of one day, such as a wedding ceremony, can be said to be a photographer with a higher intimacy with the first person, since the former photographer is with the first person for a longer time.

The intimacy calculation section 76 can calculate a photographer who has captured images in which the first person appears in a large number of places, rather than a photographer who has captured images in which the first person appears in a small number of places, as a photographer with a high intimacy with the first person.

A photographer with a high intimacy with the first person can capture images in which the first person appears in a larger number of places, but a photographer with a low intimacy with the first person can capture images in which the first person appears only in a smaller number of places. That is, a photographer who has captured images in which the first person appears in a larger number of imaging locations can be said to be a photographer with a higher intimacy with the first person, since the photographer is with the first person for a long time.

A method of counting the number of places where images have been captured is not particularly limited. For example, places where images have been captured may be divided into a plurality of blocks according to latitude and longitude and the number of blocks may be counted, or places where images have been captured may be divided according to the administrative district and the number of administrative districts may be counted, or places where images have been captured may be divided according to the nearest railway station and the number of railway stations may be counted.

The intimacy calculation section 76 can calculate a photographer who has captured images in which the first person appears in a large number of time zones, rather than a photographer who has captured images in which the first person appears in a small number of time zones, as a photographer with a high intimacy with the first person.

A photographer with a high intimacy with the first person can capture images in which the first person appears in a larger number of time zones, for example, early in the morning and at night, but a photographer with a low intimacy with the first person can capture images in which the first person appears only in a smaller number of time zones. That is, a photographer who has captured images in which the first person appears in a larger number of time zones can be said to be a photographer with a higher intimacy with the first person, since the photographer is with the first person for a long time.

A method of counting the number of time zones where images have been captured is not particularly limited. For example, the number of time zones where images have been captured may be counted by dividing one day into 24 time zones every hour, or the number of time zones where images have been captured may be counted by dividing one day into two time zones of morning and afternoon, and the number of time zones where images have been captured may be counted by dividing one day into three time zones of morning, day, and night.

The intimacy calculation section 76 can calculate the intimacy between the first person and each user based on the theme of a plurality of images.

In this case, for example, the theme determination section 78 determines the theme of a plurality of images based on the analysis result of each image and at least one of the imaging period, the number of imaging days, the number of imaging sheets, and imaging locations of a plurality of images.

Subsequently, the image division section 86 divides the plurality of images into a plurality of groups including images in which each of a plurality of persons appearing in the plurality of images appears. That is, an image in which different persons appear is included in each group.

Subsequently, the age and sex determination section 80 determines the age and sex of each person appearing in images included in each of the plurality of groups based on the analysis result of each image.

Subsequently, the human relationship determination section 82 determines the human relationship between the first person and each photographer based on at least one of the theme, the age of the person, the sex of the person, and a person appearing in an image captured by each photographer.

Subsequently, the intimacy calculation section 76 calculates the intimacy between the first person and each user based on the human relationship between the first person and each photographer.

The human relationship determination section 82 may determine the human relationship between the first person and each photographer based on the sub-theme of the theme of a plurality of images.

In this case, the image number calculation section 52 calculates the number of images in which each person included in each group appears. Subsequently, the theme determination section 78 determines the sub-theme of the theme of the plurality of images based on the number of images in which each person appears, which are included in each group.

Subsequently, the human relationship determination section 82 determines the human relationship between the first person and each photographer based on at least a sub-theme of the sub-theme, the age of the person, the sex of the person, and a person appearing in an image captured by each photographer.

Subsequently, the intimacy calculation section 76 calculates the intimacy between the first person and each user based on the human relationship between the first person and each photographer.

In evaluating intimacy, the intimacy calculation section 76 may combine viewpoints, such as calculation of the number of images in which the first person appears that are captured from above or from the short distance, calculation of the number of captured images in which the first person having a specific facial expression appears, calculation of the number of captured images in which the first person having different kinds of facial expressions appears, calculation of the number of captured images in which the first person appears, calculation of the number of days for which images in which the first person appears have been captured, calculation of the number of places where images in which the first person appears have been captured, calculation of the number of time zones where images in which the first person appears have been captured, and calculation of the intimacy between the first person and each user based on the theme or sub-theme of a plurality of images.

Hereinafter, a specific example of the case of calculating the intimacy between the first person and each user based on the theme or sub-theme of a plurality of images will be described.

TABLE 1

| | Theme determination condition | | | |
|---|---|---|---|---|
| Theme | Imaging period | Number of imaging days | Image contents | Imaging location |
| Trip | One day to two weeks | A plurality of consecutive days | landscape, cooking, signboard (illustration), . . . | Range: medium to large |
| Wedding | Several hours | One day | ring, cooking, cake, . . . | Range: medium to small |
| Graduation album | One year | many | A number of persons | Range: medium to large |

As shown in Table 1, in a case where the determination condition of the theme is an imaging period, the number of imaging days, image contents, and an imaging location, for example, if the imaging period is one day to two weeks, the number of imaging days is a plurality of consecutive days, the image contents are landscape, cooking, signboard (illustration), and the like, and the imaging location range is medium to large, the theme determination section 78 can determine that the theme is a trip.

If the imaging period is several hours, the number of imaging days is one day, the image contents are ring, cooking, cake, and the like, and the imaging location range is medium to small, the theme determination section 78 can determine that the theme is marriage.

If the imaging period is one year, the number of imaging days is large, the image contents are a number of persons, and the imaging location range is medium to large, the theme determination section 78 can determine that the theme is a graduation album.

For example, in a case where it is determined that the theme is a trip, as shown in FIG. 37, if there are a first group including images in which a person with a particularly large number of appearances in images included in groups appear and second and third groups including images in which a person with the largest number of appearances except for the first group appears, the theme determination section 78 further determines that the sub-theme of the theme of the trip is a family trip including a child and parents.

As shown in FIG. 37, if the age of a person appearing in an image included in the first group is 0, the sex of the person is female, and there is no image captured by the person, the human relationship determination section 82 determines that this person is the first person and the first person is a child.

If the age of a person appearing in an image included in the second group is 30, the sex of the person is female, and persons appearing in an image captured by the person are two persons appearing in images included in the first and third groups, it is determined that the person appearing in the image included in the second group is a photographer and the photographer is the mother of the child.

If the age of a person appearing in an image included in the third group is 30, the sex of the person is male, and persons appearing in an image captured by the person are two persons appearing in images included in the first and second groups, it is determined that the person appearing in the image included in the third group is a photographer and the photographer is the father of the child.

The intimacy calculation section 76 determines that the intimacy between the child and the mother and father (parents) is high, and increases the intimacy between the child, which is the first person, and the photographer.

In this case, for example, the image extraction section 88 can preferentially extract images in which the child who is the first person appears, among a plurality of images, and uniformly extract images in which each of the mother and father, who are photographers, appears.

In a case where it is determined that the theme is a trip, if there are a plurality of first groups including images, in which a person with the number of appearances exceeding a predetermined number appears, and a small number of second groups including images, in which a person with a small number of appearances appears, the theme determination section 78 further determines that the sub-theme of the theme of the trip is a trip of several friends.

In this case, the human relationship determination section 82 determines that all persons appearing in the images included in the plurality of first groups are the first persons or that there is no first person among the plurality of persons.

The intimacy calculation section 76 determines that the intimacy between friends is equal, and sets the intimacy between the respective friends equal.

In this case, for example, the image extraction section 88 can uniformly extract an image, in which each friend appears, among the plurality of images.

In a case where it is determined that the theme is a wedding ceremony, the theme determination section 78 does not determine the sub-theme of the wedding ceremony.

The human relationship determination section 82 determines that two persons appearing in images included in a group, which includes images in which the two persons with the largest number of appearances appear, are the first persons and the first persons are the bride and groom. Based on the theme, the age of the person, the sex of the person, and a person appearing in an image captured by each photographer, the human relationship between the bride and groom and each photographer, for example, whether each photographer is a friend of the bride and groom or a relative.

The intimacy calculation section 76 calculates the intimacy between the bride and groom and each photographer based on the human relationship between the bride and groom, who is the first person, and each photographer.

In this case, for example, the image extraction section 88 can extract an image captured by each photographer, among the plurality of images, based on the intimacy between the bride and groom and each photographer.

Thus, by calculating the intimacy between the first person and each photographer based on the theme or the sub-theme of a plurality of images, it is possible to calculate the intimacy between the first person and each photographer more accurately.

Subsequently, the secretary user instructs the composite image creation unit 26 to create a composite image through the instruction input unit 70 in the terminal device 14 of the secretary user.

When the composite image creation unit 26 is instructed to create a composite image, the cover creation section 62 creates a cover page which is a design corresponding to the information of the design of the cover page, on which the title set by the secretary user is written, and which has a color set by the secretary user (step S21).

Subsequently, the secretary user sets one of the private mode, the public mode, and the neutral mode through the instruction input unit 70 in the terminal device 14 of the secretary user.

When the mode is set, the information of one mode set by the secretary user is acquired from the terminal device 14 of the secretary user by the mode setting section 84 (step S22).

For example, the mode setting section 84 may set one of the private mode, the public mode, and the neutral mode as a default mode.

Accordingly, the secretary user can save time and effort for setting the mode in the case of using the default mode. The secretary user can freely change to any other mode from the default mode at any time.

Subsequently, the main part creation section 64 creates a main page of the photobook using at least one image among the plurality of images acquired by the image acquisition section 46 (step S23).

In the main part creation section 64, the image division section 86 divides the plurality of images acquired by the image acquisition section 46 into a plurality of groups corresponding to the number of main pages.

Subsequently, for each group of images, based on the overall evaluation value of each image, the image extraction section 88 extracts a plurality of compositing target images used in the main pages, among the images included in the group, in order from the image with the highest overall evaluation value.

Subsequently, for each group of images, the image arrangement section 90 determines the size of each compositing target image and the arrangement position in the main page based on the overall evaluation value of each image, and arranges the compositing target image on the corresponding main page. For example, a compositing target image with the highest overall evaluation value among a plurality of compositing target images arranged on the main pages is arranged at the center position of the page with a size larger the other compositing target images.

The image extraction section 88 may extract images to be used in a composite image from a plurality of images (in the present embodiment, from images included in a group for each group of images), as compositing target images, based on the intimacy between the first person and each photographer, or may extract compositing target images from a plurality of images based on both the overall evaluation value of each image and the intimacy between the first person and each photographer.

In the case of extracting a compositing target image based on the intimacy between the first person and each photographer, the image extraction section 88 extracts a compositing target image from the plurality of images based on the information of one mode acquired by the mode setting section 84.

In a case where the private mode is set, the image extraction section 88 extracts a compositing target image from a plurality of images by giving priority to an image captured by a photographer with a high intimacy with the first person over an image captured by a photographer with a low intimacy with the first person.

In this case, since a larger number of images captured by the photographer with a higher intimacy with the first person can be extracted from the plurality of images, it is possible to create a composite image with a high privacy feeling.

In a case where the public mode is set, the image extraction section 88 extracts a compositing target image from a plurality of images by giving priority to an image captured by a photographer with a low intimacy with the first person over an image captured by a photographer with a high intimacy with the first person.

In this case, since a larger number of images captured by the photographer with a lower intimacy with the first person can be extracted from the plurality of images, it is possible to create a composite image with a high public feeling.

In a case where the neutral mode is set, the image extraction section 88 extracts a compositing target image from a plurality of images regardless of the intimacy between the first person and each photographer.

In this case, since it is possible to extract images from the plurality of images regardless of the intimacy between the first person and each photographer, it is possible to create a composite image with a high neutral feeling regardless of the private feeling and the public feeling.

In the case of extracting a compositing target image based on the intimacy between the first person and each photographer, for example, when compositing target images are extracted from a plurality of images captured by the first photographer, an image in which the first photographer himself or herself appears is not included in the extracted compositing target images. In this case, the image extraction section 88 may extract an image in which the first photographer appears from a plurality of images captured by photographers other than the first photographer.

In this case, for example, the image acquisition section 46 acquires a face image of each user, and the person specifying section 72 specifies each user among a plurality of persons based on the face image of each user.

Subsequently, the image specifying section 74 specifies an image in which each photographer corresponding to each user appears, among a plurality of images, based on each user specified by the person specifying section 72.

Subsequently, the image extraction section 88 extracts a compositing target image from a plurality of images by giving priority to an image in which a photographer with a high intimacy with an important person acquired by the important person acquisition section 98 appears over an image in which a photographer with a low intimacy with the important person appears. That is, it is possible to extract a larger number of images, in which a photographer with a higher intimacy with an important person appears, from the plurality of images.

For example, in a case where a plurality of images are a group of images showing a family, the important person acquisition section 98 specifies a baby as an important person among central persons, such as parents and a baby. In this case, the image extraction section 88 extracts a compositing target image from a plurality of images by giving priority to an image in which a photographer with a high intimacy with the baby, for example, a father appears over an image in which a photographer with a low intimacy with the baby, for example, a friend appears.

Therefore, even in a case where it is difficult to preferentially extract images from a plurality of images due to reasons, such as a small number of appearances in the plurality of images, it is possible to preferentially extract images in which the photographer appears as a subject based on the intimacy between the first person and each photographer.

Subsequently, the writing creation section 66 creates a writing page of the design corresponding to the information of the design of the writing page by using the profile images and messages for writing of participating users (step S24).

In the writing creation section 66, the message division section 92 divides the messages for writing acquired by the message acquisition section 50 into groups the number of which corresponds to the number of writing pages.

Subsequently, for each group of messages for writing, for example, the message arrangement section 94 combines messages for writing included in a group with the profile image of the corresponding participating user, and arranges a result of the combination on the writing page of a page corresponding to the group of messages for writing. Thus, a writing page is created. In each writing page, messages for writing are sequentially arranged, for example, in order in which messages for writing are uploaded.

As described above, using a plurality of images, profile images of participating users, and messages for writing that have been acquired from the terminal devices 14 of two or more participating users, a photobook including a cover page corresponding to the information of the design of the cover page, main pages, and writing pages corresponding to the information of the design of the writing pages is automatically created by the cover creation section 62, the main part creation section 64, and the writing creation section 66.

In the image processing apparatus 10, it is possible to create a composite image, such as a photobook including not only the main page but also the writing page. In addition, it is possible to create a composite image reflecting not only the image quality but also the preferences of a plurality of participating users by determining not only images used in the main page but also the size of each image and the arrangement position in the main page based on the overall evaluation value of each image.

The secretary user views each page of the photobook, which includes the cover page, the main page, and the writing page that have been automatically created, in the terminal device 14 of the secretary user. The secretary user may adopt the photobook created automatically as it is, or may edit the contents of each page, for example, images used in each page, the size of each image, and the arrangement positions of images and messages for writing. In addition, it is possible to add comments, add a stamp image, and change the background type and color of each page.

The secretary user completes the creation of the photobook during the composite image creation period set by the schedule setting section 36, in the case of the present embodiment, by December 4, and orders an image product with the contents of the photobook that has been created (step S25). The image product ordered by the secretary user includes at least one of a photobook of a paper medium and a photobook of electronic data.

When the image product is ordered, the photobook of the ordered image product is created and is sent to the delivery address by the delivery date of the image product set by the schedule setting section 36, in the case of the present embodiment, by December 20 (step S26). In the case of a photobook of a paper medium, for example, the photobook of a paper medium is transmitted to the delivery address. In the case of a photobook of electronic data, for example, the photobook of electronic data or an URL for downloading electronic data is transmitted to the e-mail address of the delivery address.

As described above, in the image processing apparatus 10, it is possible to create a composite image, such as a photobook including a writing page, using a plurality of images and messages for writing acquired from the terminal devices 14 of a plurality of participating users.

It is not essential for only the secretary user to create a composite image, and a plurality of users involved in the creation of a composite image may create a composite image together with each other, or at least one of a plurality of users may create a composite image.

The specific configuration of each unit of the image processing apparatus 10 is not particularly limited, and it is possible to use various configurations capable of performing the same functions. In the embodiment described above, the server 12 includes the information setting unit 18, the information management unit 20, the data acquisition unit 22, the data analysis unit 24, and the composite image creation unit 26, at least one of these may be provided in the terminal device 14 of the user.

In the apparatus of the invention, each component of the apparatus may be formed using dedicated hardware, or each component may be formed using a programmed computer.

The method of the invention can be realized, for example, by a program causing a computer to execute each step of the method. In addition, it is also possible to provide a computer-readable recording medium in which the program is recorded.

While the invention has been described in detail, the invention is not limited to the above-described embodiment, and various improvements and modifications may be made without departing from the scope and spirit of the invention.

10: image processing apparatus
12: server
14: terminal device (client)
16: network
18: information setting unit
20: information management unit
22: data acquisition unit
24: data analysis unit
26: composite image creation unit
28: budget setting section
30: product item acquisition section
32: cover design setting section
34: writing design setting section
36: schedule setting section
38: setting storage section
40: account information storage section
42: management screen information transmission section
44: upload prompting section
46: image acquisition section
48: evaluation information acquisition section
50: message acquisition section
52: image number calculation section
54: evaluation number calculation section
56: message number calculation section
58: image analysis section
60: evaluation value calculation section
62: cover creation section
64: main part creation section
66: writing creation section
68: image display unit
70: instruction input unit
72: person specifying section
74: image specifying section
76: intimacy calculation section
78: theme determination section
80: age and sex determination section
82: human relationship determination section
84: mode setting section
86: image division section
88: image extraction section
90: image arrangement section
92: message division section
94: message arrangement section
96: photographer information acquisition section
98: important person acquisition section

What is claimed is:

1. An image processing apparatus, comprising:
a processor configured to
acquire a plurality of images from terminal devices of a plurality of users through a network;
acquire information of a photographer who has captured each of the plurality of images, through the network, from the terminal devices of the plurality of users;
analyze contents of each of the images;
determine persons appearing in each of the images based on an analysis result of each of the images and specifies one or more first persons among the determined persons; and
calculate an intimacy between the first person and each photographer based on presence of the first person in each of the images and the photographer information of each of the images,
wherein the processor calculates a photographer who has captured a large number of images, in which the first person whose proportion occupying an image exceeds a first threshold value or whose imaging distance is less than a second threshold value appears, as a photographer with a high intimacy with the first person, rather than a photographer who has captured a small number of images, in which the first person whose proportion occupying an image exceeds the first threshold value or whose imaging distance is less than the second threshold value appears.

2. The image processing apparatus according to claim 1, wherein the processor calculates a photographer who has captured a large number of images in which the first person having a specific facial expression appears, rather than a photographer who has captured a small number of images in which the first person having the specific facial expression appears, as a photographer with a high intimacy with the first person.

3. The image processing apparatus according to claim 1, wherein the processor calculates a photographer who has captured images in which the first person having many kinds of facial expressions appears, rather than a photographer who has captured images in which the first person having few kinds of facial expressions appears, as a photographer with a high intimacy with the first person.

4. The image processing apparatus according to claim 1, wherein the processor calculates a photographer who has captured a large number of images in which the first person appears, rather than a photographer who has captured a small number of images in which the first person appears, as a photographer with a high intimacy with the first person.

5. The image processing apparatus according to claim 1, wherein the processor calculates a photographer with a large number of days of capturing images in which the first person appears, rather than a photographer with a small number of days of capturing images in which the first person appears, as a photographer with a high intimacy with the first person.

6. The image processing apparatus according to claim 1, wherein the processor calculates a photographer who has captured images in which the first person appears in a large number of places, rather than a photographer who has captured images in which the first person appears in a small number of places, as a photographer with a high intimacy with the first person.

7. The image processing apparatus according to claim 1, wherein the processor calculates a photographer who has captured images in which the first person appears in a large number of time zones, rather than a photographer who has captured images in which the first person appears in a small number of time zones, as a photographer with a high intimacy with the first person.

8. The image processing apparatus according to claim 1, the processor further configured to:
determine a theme of the plurality of images based on the analysis result of each of the images and at least one of an imaging period, the number of imaging days, the number of imaging sheets, and imaging locations of the plurality of images;
determine age and sex of each person appearing in each image based on the analysis result of each image; and
determine a human relationship between the first person and each photographer based on at least one of the theme, the age of the person, the sex of the person, and a person appearing in an image captured by each photographer,
wherein the processor further calculates an intimacy between the first person and each of the users based on a human relationship between the first person and each photographer.

9. The image processing apparatus according to claim 8, the processor further configured to:
divide the plurality of images into a plurality of groups including images in which the respective persons appear,
wherein the determine age and sex of each person appearing in images included in each of the plurality of groups based on the analysis result of each image.

10. The image processing apparatus according to claim 8, the processor further configured to:
calculate the number of images in which each of the persons appears,
wherein the processor determines a sub-theme of the theme of the plurality of images based on the number of images in which each of the persons appears, and the processor determines a human relationship between the first person and each photographer based on at least the sub-theme.

11. The image processing apparatus according to claim 1, the processor further configured to:
extract images to be used in a composite image, as compositing target images, from the plurality of images based on the intimacy between the first person and each photographer; and
create the composite image using the compositing target images.

12. The image processing apparatus according to claim 11,
wherein the processor extracts the compositing target images from the plurality of images by giving priority to an image captured by a photographer with a high intimacy with the first person over an image captured by a photographer with a low intimacy with the first person.

13. The image processing apparatus according to claim 11,
wherein the processor extracts the compositing target images from the plurality of images by giving priority to an image captured by a photographer with a low intimacy with the first person over an image captured by a photographer with a high intimacy with the first person.

14. The image processing apparatus according to claim 11, the processor further configured to:
acquire information of one mode of a first mode, a second mode, and a third mode set by a first user of the plurality of users, through the network, from a terminal device of the first user,
wherein the processor extracts the compositing target images from the plurality of images by giving priority to an image captured by a photographer with a high intimacy with the first person over an image captured by a photographer with a low intimacy with the first person based on the information of the mode in a case where the first mode is set, extracts the compositing target images from the plurality of images by giving priority to an image captured by a photographer with a low intimacy with the first person over an image captured by a photographer with a high intimacy with the first person based on the information of the mode in a case where the second mode is set, and extracts the compositing target images from the plurality of images based on the information of the mode regardless of the intimacy between the first person and each photographer in a case where the third mode is set.

15. The image processing apparatus according to claim 11, the processor further configured to:
specify an image captured by each of a plurality of photographers corresponding to the plurality of users, among the plurality of images, based on the photographer information of each of the images.

16. The image processing apparatus according to claim 15, the processor further configured to:
acquire an important person among the first persons,
wherein the processor further acquires a face image of each of the users,
the processor further specifies each of the users among the plurality of persons based on the face image of each of the users, the processor further specifies an image in which each of the photographers corresponding to the users appears, among the plurality of images, based on each specified user, and the processor further extracts the compositing target images from the plurality of images by giving priority to an image in which a photographer with a high intimacy with the important person appears over an image in which a photographer with a low intimacy with the important person appears.

17. The image processing apparatus according to claim 11, the processor further configured to:
specify an image captured by each of a plurality of photographers corresponding to the plurality of users, among the plurality of images, based on information of a photographer of each of the images included in accessory information of each of the images.

18. The image processing apparatus according to claim 11, the processor further configured to:
in a case where each of the images is acquired from a terminal device of each of the users by the image acquisition unit, determine that the user of each terminal device from which each of the images has been acquired is each photographer who has captured each of the acquired images and specifies an image captured by each of a plurality of photographers corresponding to the plurality of users among the plurality of images.

19. An image processing method using a processor, comprising:
a step in which the processor acquires a plurality of images from terminal devices of a plurality of users through a network;
a step in which the processor acquires information of a photographer who has captured each of the plurality of images, through the network, from the terminal devices of the plurality of users;
a step in which the processor analyzes contents of each of the images;
a step in which the processor determines persons appearing in each of the images based on an analysis result of each of the images and specifies one or more first persons among the determined persons; and
a step in which the processor calculates an intimacy between the first person and each photographer based on presence of the first person in each of the images and the photographer information of each of the images,
wherein the processor calculates a photographer who has captured a large number of images, in which the first person whose proportion occupying an image exceeds a first threshold value or whose imaging distance is less than a second threshold value appears, as a photographer with a high intimacy with the first person, rather than a photographer who has captured a small number of images, in which the first person whose proportion occupying an image exceeds the first threshold value or whose imaging distance is less than the second threshold value appears.

20. The image processing method according to claim 19, further comprising:
a step in which the processor determines a theme of the plurality of images based on the analysis result of each of the images and at least one of an imaging period, the number of imaging days, the number of imaging sheets, and imaging locations of the plurality of images;
a step in which the processor determines age and sex of each person appearing in each image based on the analysis result of each image; and a step in which the processor determines a human relationship between the first person and each photographer based on at least one of the theme, the age of the person, the sex of the person, and a person appearing in an image captured by each photographer,
wherein, in the step of calculating the intimacy, an intimacy between the first person and each of the users is further calculated based on a human relationship between the first person and each photographer.

21. The image processing method according to claim 19, further comprising:
a step in which the processor extracts images to be used in a composite image, as compositing target images, from the plurality of images based on the intimacy between the first person and each photographer; and
a step in which the processor creates the composite image using the compositing target images.

22. The image processing method according to claim 21, further comprising:
a step in which the processor specifies an image captured by each of a plurality of photographers corresponding to the plurality of users, among the plurality of images, based on the photographer information of each of the images.

23. The image processing method according to claim 22, further comprising:
a step in which the processor acquires an important person among the first persons;
a step in which the processor acquires a face image of each of the users;
a step in which the processor specifies each of the users among the plurality of persons based on the face image of each of the users; and
a step in which the processor specifies an image in which each of the photographers corresponding to the users appears, among the plurality of images, based on each specified user,
wherein, in the step of extracting an image, the compositing target images are extracted from the plurality of images by giving priority to an image in which a photographer with a high intimacy with the important person appears over an image in which a photographer with a low intimacy with the important person appears.

24. A computer-readable recording medium in which a program stored on a non-transitory computer recording medium causing a computer to execute each step of the image processing method according to claim 19 is recorded.

25. An image processing apparatus, comprising:
a processor configured to
acquire a plurality of images from terminal devices of a plurality of users through a network;
acquire information of a photographer who has captured each of the plurality of images, through the network, from the terminal devices of the plurality of users;
analyze contents of each of the images;
determine persons appearing in each of the images based on an analysis result of each of the images and specifies one or more first persons among the determined persons;
calculate an intimacy between the first person and each photographer based on presence of the first person in each of the images and the photographer information of each of the images;
extract images to be used in a composite image, as compositing target images, from the plurality of images based on the intimacy between the first person and each photographer; and create the composite image using the compositing target images.

\* \* \* \* \*